(12) United States Patent
Friedman et al.

(10) Patent No.: US 11,724,964 B2
(45) Date of Patent: Aug. 15, 2023

(54) MULTI-PANE ELECTROCHROMIC WINDOWS

(71) Applicant: View, Inc., Milpitas, CA (US)

(72) Inventors: Robin Friedman, Sunnyvale, CA (US); Sridhar Karthik Kailasam, Fremont, CA (US); Rao Mulpuri, Saratoga, CA (US); Ronald A. Powell, Portola Valley, CA (US); Dhairya Shrivastava, Los Altos, CA (US)

(73) Assignee: View, Inc., Milpitas, CA (US)

( * ) Notice: Subject to any disclaimer, the term of this patent is extended or adjusted under 35 U.S.C. 154(b) by 230 days.

(21) Appl. No.: 17/100,653

(22) Filed: Nov. 20, 2020

(65) Prior Publication Data

US 2021/0214274 A1 Jul. 15, 2021

Related U.S. Application Data

(63) Continuation of application No. 16/122,778, filed on Sep. 5, 2018, now Pat. No. 10,890,820, which is a (Continued)

(51) Int. Cl.
*C03C 17/34* (2006.01)
*G02F 1/155* (2006.01)
(Continued)

(52) U.S. Cl.
CPC ............. *C03C 17/34* (2013.01); *C03C 17/36* (2013.01); *C03C 17/3657* (2013.01);
(Continued)

(58) Field of Classification Search
CPC .......... G02B 26/023; G02B 1/002; B60J 3/04; B60R 1/088
See application file for complete search history.

(56) References Cited

U.S. PATENT DOCUMENTS

| 4,923,289 A | 5/1990 | Demiryont |
| 5,076,673 A * | 12/1991 | Lynam ............... G02F 1/153 |
| | | 359/275 |

(Continued)

FOREIGN PATENT DOCUMENTS

| CN | 1372511 A | 10/2002 |
| CN | 1501155 A | 6/2004 |

(Continued)

OTHER PUBLICATIONS

U.S. Office Action, dated Jan. 6, 2012, in U.S. Appl. No. 12/851,514.
(Continued)

*Primary Examiner* — James C. Jones
(74) *Attorney, Agent, or Firm* — Weaver Austin Villeneuve & Sampson LLP; Brian D. Griedel

(57) ABSTRACT

Window units, for example insulating glass units (IGU's), that have at least two panes, each pane having an electrochromic device thereon, are described. Two optical state devices on each pane of a dual-pane window unit provide window units having four optical states. Window units described allow the end user a greater choice of how much light is transmitted through the electrochromic window. Also, by using two or more window panes, each with its own electrochromic device, registered in a window unit, visual defects in any of the individual devices are negated by virtue of the extremely small likelihood that any of the visual defects will align perfectly and thus be observable to the user.

17 Claims, 13 Drawing Sheets

Related U.S. Application Data continuation of application No. 14/796,819, filed on Jul. 10, 2015, now Pat. No. 10,088,731, which is a continuation of application No. 14/534,059, filed on Nov. 5, 2014, now Pat. No. 9,116,410, which is a continuation of application No. 14/160,425, filed on Jan. 21, 2014, now Pat. No. 8,908,259, which is a continuation of application No. 13/619,772, filed on Sep. 14, 2012, now Pat. No. 8,665,512, which is a continuation of application No. 12/851,514, filed on Aug. 5, 2010, now Pat. No. 8,270,059.

(51) Int. Cl.

| | | |
|---|---|---|
| C03C 17/36 | (2006.01) | |
| H05B 3/86 | (2006.01) | |
| E06B 9/24 | (2006.01) | |
| G02F 1/1523 | (2019.01) | |
| G02F 1/153 | (2006.01) | |
| G02F 1/1347 | (2006.01) | |
| E06B 7/28 | (2006.01) | |
| G02F 1/157 | (2006.01) | |
| G02F 1/161 | (2006.01) | |
| E06B 9/264 | (2006.01) | |

(52) U.S. Cl.
CPC ............ *C03C 17/3681* (2013.01); *E06B 7/28* (2013.01); *E06B 9/24* (2013.01); *G02F 1/1347* (2013.01); *G02F 1/153* (2013.01); *G02F 1/155* (2013.01); *G02F 1/157* (2013.01); *G02F 1/1523* (2013.01); *G02F 1/161* (2013.01); *H05B 3/86* (2013.01); *E06B 2009/2464* (2013.01); *E06B 2009/2643* (2013.01); *G02F 2001/1555* (2013.01); *H05B 2203/013* (2013.01)

(56) References Cited

U.S. PATENT DOCUMENTS

| | | |
|---|---|---|
| 5,244,557 A | 9/1993 | Defendini et al. |
| 5,379,146 A | 1/1995 | Defendini |
| 5,657,149 A | 8/1997 | Buffat et al. |
| 5,724,175 A | 3/1998 | Hichwa et al. |
| 5,985,486 A | 11/1999 | Giron |
| 6,001,487 A | 12/1999 | Ladang et al. |
| 6,045,896 A | 4/2000 | Boire et al. |
| 6,055,088 A | 4/2000 | Fix et al. |
| 6,277,523 B1 | 8/2001 | Giron |
| 6,317,248 B1 | 11/2001 | Agrawal et al. |
| 6,337,758 B1 | 1/2002 | Beteille et al. |
| 6,529,308 B2 | 3/2003 | Beteille et al. |
| 6,561,460 B2 | 5/2003 | Rukavina et al. |
| 6,707,590 B1 | 3/2004 | Bartsch |
| 6,791,737 B2 | 9/2004 | Giron |
| 6,940,628 B2 | 9/2005 | Giron |
| 7,002,720 B2 | 2/2006 | Beteille et al. |
| 7,033,655 B2 | 4/2006 | Beteille et al. |
| 7,133,181 B2 | 11/2006 | Greer |
| 7,204,102 B1 | 4/2007 | Eames et al. |
| 7,230,748 B2 | 6/2007 | Giron et al. |
| 7,277,215 B2 | 10/2007 | Greer |
| 7,531,101 B2 | 5/2009 | Beteille |
| 7,869,114 B2 | 1/2011 | Valentin et al. |
| 7,894,119 B2 | 2/2011 | Valentin et al. |
| 7,894,120 B2 | 2/2011 | Valentin et al. |
| 7,929,194 B2 | 4/2011 | Legois et al. |
| 8,035,882 B2 | 10/2011 | Fanton et al. |
| 8,270,059 B2 | 9/2012 | Friedman et al. |
| 8,665,512 B2 | 3/2014 | Friedman et al. |
| 8,908,259 B2 | 12/2014 | Friedman et al. |
| 9,116,410 B2 | 8/2015 | Friedman et al. |
| 9,829,763 B2 | 11/2017 | Friedman et al. |
| 10,088,731 B2 | 10/2018 | Friedman et al. |
| 10,890,820 B2 | 1/2021 | Friedman et al. |
| 2002/0021481 A1 | 2/2002 | Lin et al. |
| 2002/0048678 A1 | 4/2002 | Hunia et al. |
| 2002/0075552 A1 | 6/2002 | Poll et al. |
| 2003/0227663 A1 | 12/2003 | Agrawal et al. |
| 2004/0047050 A1 | 3/2004 | Bauer et al. |
| 2005/0002081 A1 | 1/2005 | Beteille et al. |
| 2005/0200935 A1 | 9/2005 | Liu et al. |
| 2006/0018000 A1 | 1/2006 | Greer |
| 2006/0077511 A1 | 4/2006 | Poll et al. |
| 2006/0245024 A1 | 11/2006 | Greer |
| 2007/0002421 A1 | 1/2007 | Rukavina et al. |
| 2007/0020442 A1 | 1/2007 | Giron et al. |
| 2007/0103761 A1 | 5/2007 | Giron et al. |
| 2007/0103763 A1 | 5/2007 | Poll et al. |
| 2007/0133078 A1 | 6/2007 | Fanton et al. |
| 2007/0258128 A1 | 11/2007 | Guarr et al. |
| 2009/0058295 A1 | 3/2009 | Auday et al. |
| 2009/0067031 A1 | 3/2009 | Piroux et al. |
| 2009/0097098 A1 | 4/2009 | Piroux |
| 2009/0114928 A1 | 5/2009 | Messere et al. |
| 2009/0130409 A1 | 5/2009 | Reutler et al. |
| 2009/0181203 A1 | 7/2009 | Valentin et al. |
| 2009/0231662 A1 | 9/2009 | Sorensson et al. |
| 2009/0251758 A1 | 10/2009 | Valentin et al. |
| 2009/0262411 A1 | 10/2009 | Karmhag et al. |
| 2009/0297806 A1 | 12/2009 | Dawson-Elli et al. |
| 2009/0323160 A1 | 12/2009 | Egerton et al. |
| 2010/0079844 A1 | 4/2010 | Kurman et al. |
| 2010/0103496 A1 | 4/2010 | Schwendeman et al. |
| 2010/0208326 A1 | 8/2010 | Kwak et al. |
| 2010/0243427 A1 | 9/2010 | Kozlowski et al. |
| 2010/0245973 A1 | 9/2010 | Wang et al. |
| 2011/0043885 A1 | 2/2011 | Lamine et al. |
| 2011/0059275 A1 | 3/2011 | Stark |
| 2011/0216389 A1 | 9/2011 | Piroux et al. |
| 2011/0260961 A1 | 10/2011 | Burdis |
| 2011/0266137 A1 | 11/2011 | Wang et al. |
| 2011/0266138 A1 | 11/2011 | Wang et al. |
| 2011/0267672 A1 | 11/2011 | Sbar et al. |
| 2011/0267674 A1 | 11/2011 | Wang et al. |
| 2011/0267675 A1 | 11/2011 | Wang et al. |
| 2011/0299149 A1 | 12/2011 | Park et al. |
| 2012/0033287 A1 | 2/2012 | Friedman et al. |
| 2012/0275008 A1* | 11/2012 | Pradhan ............... C23C 14/083 204/192.1 |
| 2013/0021659 A1 | 1/2013 | Friedman et al. |
| 2014/0307301 A1 | 10/2014 | Friedman et al. |
| 2015/0062688 A1 | 3/2015 | Friedman et al. |
| 2015/0316827 A1 | 11/2015 | Friedman et al. |
| 2016/0033837 A1 | 2/2016 | Bjornard et al. |
| 2016/0154289 A1 | 6/2016 | Friedman et al. |
| 2018/0373110 A1 | 12/2018 | Friedman et al. |

FOREIGN PATENT DOCUMENTS

| | | |
|---|---|---|
| CN | 101322069 A | 12/2008 |
| CN | 101495916 A | 7/2009 |
| DE | 10 2008 064634 A1 | 10/2009 |
| EP | 2 348 357 | 7/2011 |
| FR | 2906832 | 4/2008 |
| TW | 201003270 A1 | 1/1999 |
| WO | WO 2005/076061 | 8/2005 |
| WO | WO 2008/043951 | 4/2008 |
| WO | WO 2009/109814 | 9/2009 |
| WO | WO 2011/010067 | 1/2011 |
| WO | WO 2011/028253 | 3/2011 |
| WO | WO 2011/028254 | 3/2011 |
| WO | WO 2011/050291 | 4/2011 |
| WO | WO 2011/109688 | 9/2011 |

OTHER PUBLICATIONS

U.S. Office Action, dated May 30, 2012, in U.S. Appl. No. 12/851,514.
U.S. Notice of Allowance, dated Jun. 26, 2012, in U.S. Appl. No. 12/851,514.

(56) References Cited

OTHER PUBLICATIONS

U.S. Notice of Allowance, dated Aug. 3, 2012, in U.S. Appl. No. 12/851,514.
U.S. Office Action dated Jul. 8, 2013 in U.S. Appl. No. 13/619,772.
U.S. Final Office Action dated Sep. 30, 2013 in U.S. Appl. No. 13/619,772.
U.S. Notice of Allowance dated Dec. 2, 2013 in U.S. Appl. No. 13/619,772.
U.S. Office Action dated Apr. 30, 2014 in U.S. Appl. No. 14/160,425.
U.S. Notice of Allowance dated Aug. 19, 2014 in U.S. Appl. No. 14/160,425.
U.S. Office Action dated Jan. 9, 2015 in U.S. Appl. No. 14/534,059.
U.S. Notice of Allowance dated Apr. 23, 2015 in U.S. Appl. No. 14/534,059.
U.S. Office Action dated Sep. 16, 2015 in U.S. Appl. No. 14/796,819.
U.S. Final Office Action dated Jul. 29, 2016 in U.S. Appl. No. 14/796,819.
U.S. Office Action dated Feb. 13, 2017 in U.S. Appl. No. 14/796,819.
U.S. Notice of Allowance dated Nov. 16, 2017 in U.S. Appl. No. 14/796,819.
U.S. Notice of Allowance dated Jun. 15, 2018 in U.S. Appl. No. 14/796,819.
U.S. Office Action dated Aug. 9, 2016 in U.S. Appl. No. 15/013,905.
U.S. Final Office Action dated May 19, 2017 in U.S. Appl. No. 15/013,905.
U.S. Notice of Allowance dated Sep. 18, 2017 in U.S. Appl. No. 15/013,905.
U.S. Office Action dated Jul. 10, 2019 in U.S. Appl. No. 16/122,778.
U.S. Final Office Action dated Feb. 24, 2020 in U.S. Appl. No. 16/122,778.
U.S. Notice of Allowance dated Aug. 28, 2020, 2020 in U.S. Appl. No. 16/122,778.
PCT International Search Report and Written Opinion, dated Dec. 9, 2011, issued in PCT/US2011/045923.
PCT Intl Preliminary Report on Patentability, dated Feb. 14, 2013, issued in PCT/US2011/045923.
CN Office Action dated Feb. 27, 2015 in CN Application 201180045191.8.
CN Office Action dated Sep. 16, 2015 in CN Application 201180045191.8.
CN Office Action dated May 5, 2016 in CN Application 201180045191.8.
CN Office Action dated Jan. 10, 2020 in CN Application 201710167066.3.
CN Office Action dated Oct. 12, 2020 in CN Application 201710167066.3.
Extended European Search Report dated Feb. 18, 2016 in EP Application No. 11815114.1.
Extended European Search Report dated Sep. 25, 2020 in EP Application No. 20161565.5.
EP Office Action dated Feb. 1, 2017 in EP Application No. 11815114.1.
TW Office Action dated Jun. 2, 2016 in TW Application No. 100127806.
TW Office Action dated Jan. 5, 2018 in TW Application No. 106103396.
TW Office Action dated Jan. 21, 2019 in TW Application No. 107128624.
Halio Smart-Tinting Glass System, Product Data Sheet, Kinestral Technologies, 2017, 4 pp.
Halio Black Insulated Glass Unit, Product Data Sheet, Kinestral Technologies, 2020, 5 pp.
CN Office Action dated Jan. 3, 2023 in Application No. CN201710167066.3 with English translation.
CN Office Action dated Mar. 23, 2021 in CN Application 201710167066.3.

* cited by examiner

MULTI-PANE ELECTROCHROMIC WINDOWS

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD OF INVENTION

The invention relates generally to electrochromic devices, more particularly electrochromic windows.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material, for example, is tungsten oxide ($WO_3$). Tungsten oxide is a cathodic electrochromic material in which a coloration transition, transparent to blue, occurs by electrochemical reduction.

While electrochromism was discovered in the 1960's, electrochromic devices still unfortunately suffer various problems and have not begun to realize their full commercial potential. Electrochromic materials may be incorporated into, for example, windows and mirrors. The color, transmittance, absorbance, and/or reflectance of such windows and mirrors may be changed by inducing a change in the electrochromic material. However, advancements in electrochromic technology, apparatus and related methods of making and/or using them, are needed because conventional electrochromic windows suffer from, for example, high defectivity and low versatility.

SUMMARY OF INVENTION

Herein are described window units, for example insulating glass units (IGU's), that have at least two panes, each pane having an electrochromic (EC) device thereon. For example, when a window unit has two panes, each with two optical states, then the window unit may have up to four optical states. Window units described herein allow the window user a greater choice, that is versatility, in how much light is transmitted through the electrochromic window, that is, the multi-pane IGU allows a gradation of transmission rather than a simple "on or off" conventional two-state window. Improved two-state windows are, however, an embodiment of the invention. Windows described herein allow the user, for example, to tailor the irradiation and heat load entering a room. A secondary benefit is the improvement in defectivity due to non-aligned optical defects. The inventors have discovered that by using two or more window panes, each with its own electrochromic device, registered in a window unit, that is, one in front of the other, visual defects in any of the individual devices are negated by virtue of the extremely small likelihood that any of the visual defects will align perfectly and thus be observable to the user.

Virtually any electrochromic device or devices can be used in combination on panes of a window unit, however, low-defect electrochromic devices work particularly well due to the lower likelihood that any visual defects will align and thus be observable to the end user. In one embodiment, two-state, for example having a high and a low transmittance, all solid state low-defectivity electrochromic devices, one on each of two opposing panes of a dual pane IGU are used in order to create a four-state electrochromic window. In this way, the end user has four choices for how much light passes through the window unit and there are virtually no detectable visual defects to the observer when the electrochromic window is colored. Other advantages of this technology are described herein.

One embodiment is a window unit including: a first substantially transparent substrate and a first electrochromic device disposed thereon; a second substantially transparent substrate and a second electrochromic device disposed thereon; and a sealing separator between the first and second substantially transparent substrates, which sealing separator defines, together with the first and second substantially transparent substrates, an interior region that is thermally insulating. Embodiments include substrates of architectural glass scale and may employ a low emissivity coating. In certain embodiments, at least one of the first and second electrochromic devices faces the interior region, in some cases both the first and second electrochromic devices face the interior region.

In one embodiment, at least one of the first and second electrochromic devices is a two-state electrochromic device, in some embodiments both of the first and second electrochromic devices are two-state electrochromic devices and the window unit has four optical states. In one embodiment, when mounted, the first substantially transparent substrate of the window unit will face outside a room or building and the second substantially transparent substrate will face inside said room or building. In one embodiment, each of the first and second electrochromic devices has its own high transmissive state and low transmissive state, and in a particular embodiment, the transmittance of the second electrochromic device's low transmissive state is higher than the transmittance of the first electrochromic device's low transmissive state. In one embodiment, the transmittance of the first electrochromic device's low transmissive state is between about 5% and about 15%, and the first electrochromic devices' high transmissive state is between about 75% and about 95%; and the transmittance of the second electrochromic device's low transmissive state is between about 20% and about 30%, and the second electrochromic devices' high transmissive state is between about 75% and about 95%. For the purposes of this embodiment, the device's transmissive states include the transmissivity of the substrate on which the substrate is constructed.

Window units described herein can have four optical states by virtue of each device having two optical states, colored or bleached, corresponding to a low transmissivity and a high transmissivity, respectively. Each of the four optical states is a product of the transmissivity of the two electrochromic devices. In one embodiment, the window unit's four optical states are: i) overall transmittance of between about 60% and about 90%; ii) overall transmittance of between about 15% and about 30%; iii) overall transmittance of between about 5% and about 10%; and iv) overall transmittance of between about 0.1% and about 5%.

In one embodiment, the electrochromic device on the substrate that will face the outside environment can be configured to better withstand environmental degradation than the electrochromic device on the substrate that faces the interior of a structure in which the window unit is installed. In one embodiment, at least one of the first and second electrochromic devices is an entirely solid state and inorganic device.

Another embodiment is a method of fabricating a window unit, the method including: arranging, substantially parallel to each other, a first substantially transparent substrate with a first electrochromic device disposed thereon and a second substantially transparent substrate with a second electrochromic device disposed thereon; and installing a sealing separator between the first and second substantially transparent substrates, which sealing separator defines, together with the first and second substantially transparent substrates, an interior region, said interior region thermally insulating.

These and other features and advantages will be described in further detail below, with reference to the associated drawings.

BRIEF DESCRIPTION OF THE DRAWINGS

The following detailed description can be more fully understood when considered in conjunction with the drawings in which.

DETAILED DESCRIPTION

Herein are described window units, for example IGU's, that have at least two panes, each pane having an electrochromic device thereon. For example, when a window unit has two panes, each with two optical states, then the window unit can have four optical states. Window units described herein allow the window user a greater choice of how much light is transmitted through the electrochromic window, that is, the multi-pane IGU concept allows a gradation of transmission rather than a simple "on or off" conventional two-state window. A secondary benefit is the improvement in defectivity due to non-aligned optical defects, even for two-state windows. The inventors have discovered that by using two or more window panes, each with its own electrochromic device, registered in a window unit, that is, one in front of the other, visual defects in any of the individual devices are negated by virtue of the extremely small likelihood that any of the visual defects will align perfectly and thus be observable to the user. Further benefits include allowing usage of lower yield electrochromic glass, because defectivity can be higher if two electrochromic panes are combined as described. This saves money both from a manufacturing standpoint as well as reducing waste streams. Additional benefits include enhanced depth of color suitable for privacy glass applications, curtaining effects can be offset in order to provide a more uniform coloration of the window, and individual devices can be of unique color so as to provide some level of color control.

Certain embodiments are described in relation to low-defectivity all solid state and inorganic electrochromic devices, however, the invention is not limited in this way. Virtually any electrochromic device or devices can be used in combination, however, low-defect electrochromic devices work particularly well due to the lower likelihood that any visual defects will align and thus be observable to the end user.

Figure 5:
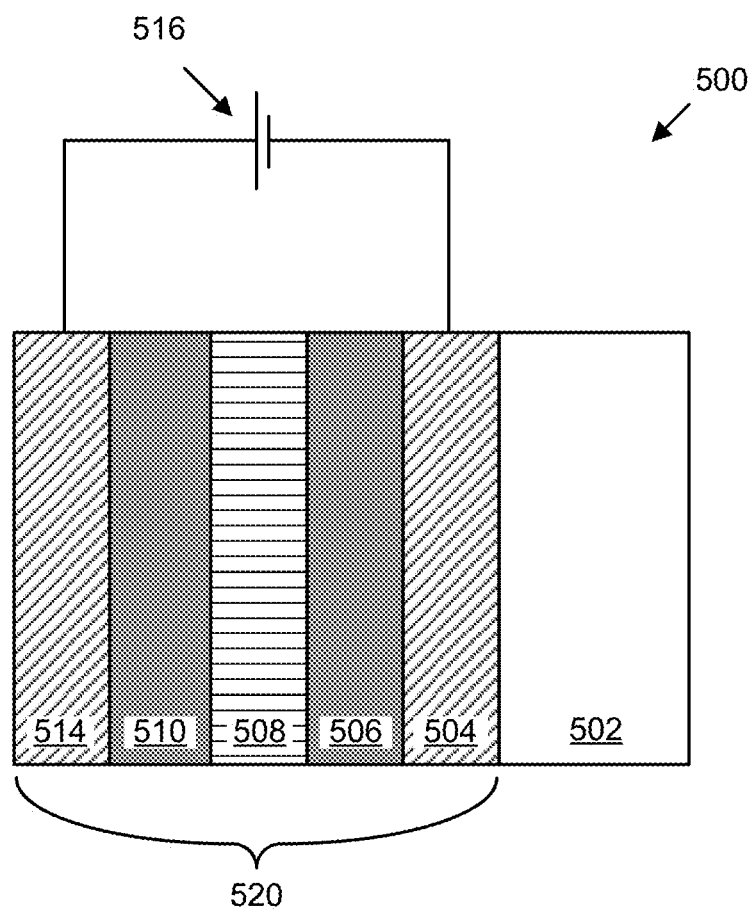
FIG. 5 is a schematic cross-section of an electrochromic device.
Figure 6A:
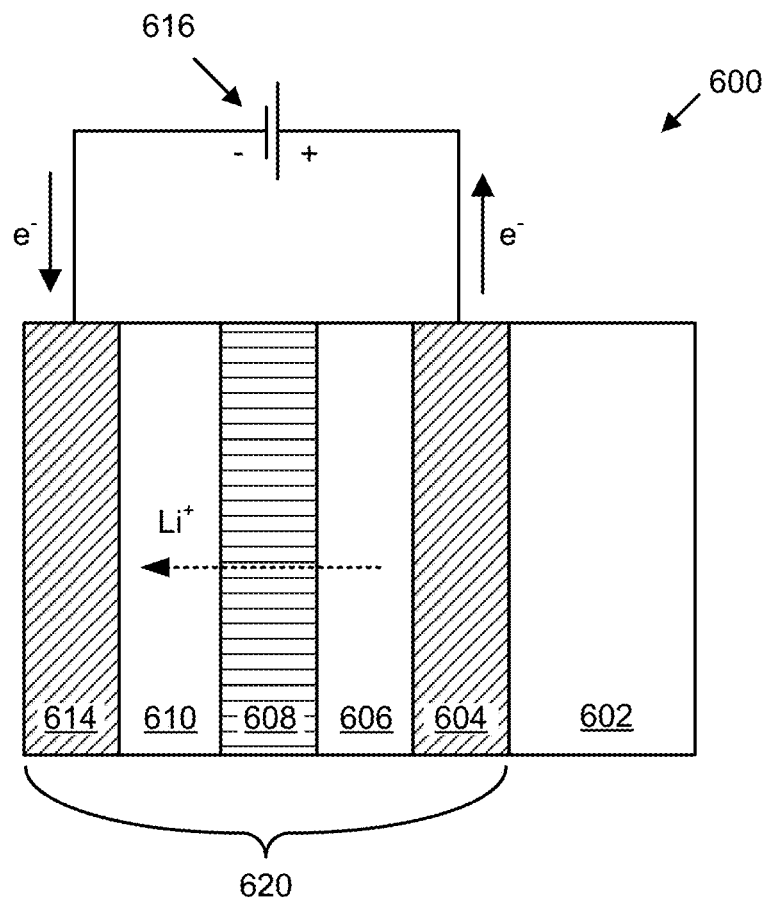
FIG. 6A is a schematic cross-section of an electrochromic device in a bleached state.
Figure 6B:
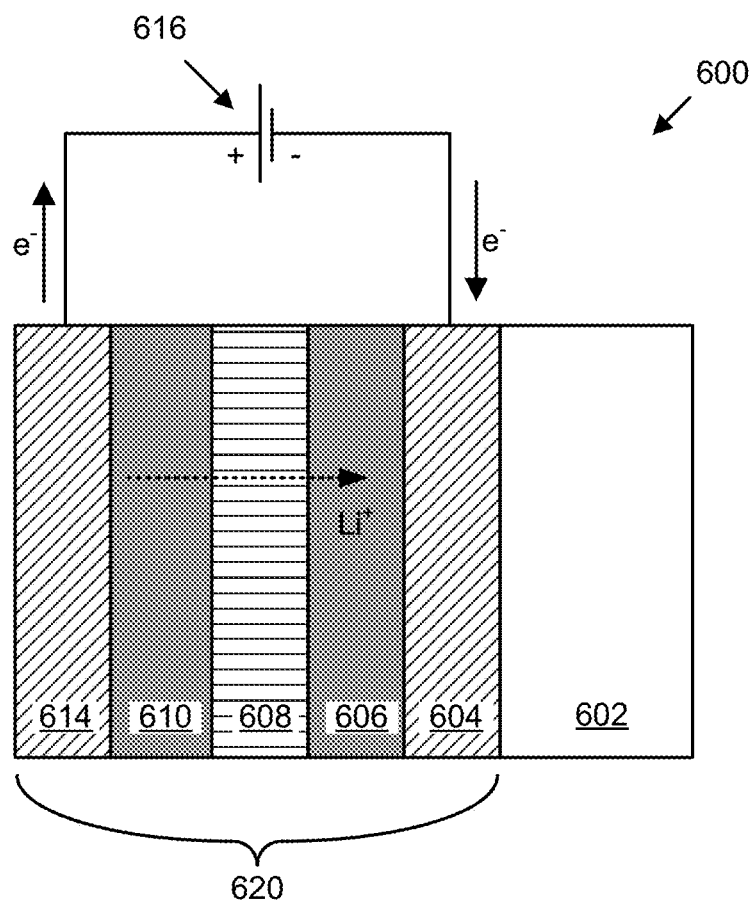
FIG. 6B is a schematic cross-section of an electrochromic device in a colored state.

One of ordinary skill in the art would appreciate that "two-state" electrochromic devices refers to the bleached state and the colored state, each of which require an applied current. In reality, a two-state EC device will actually have three states: bleached, colored and neutral. "Neutral" describes the 'natural' state of the window with no charge applied, to either bleach or color the window (for example, FIG. 5 shows an EC device in a neutral state, while FIGS. 6A and 6B show bleached and colored states, respectively). For the purposes of this application, "states" of an electrochromic device are assumed to be colored or transparent states achieved by application of current to the EC device, although neutral states are inherent to the devices. For example, a "two-state" multi-pane electrochromic window, for example having two panes, each with an electrochromic device, as described herein, will actually have (net) states where one or both of the electrochromic devices has no applied current. Thus if one electrochromic device is in a colored state and the other electrochromic device is "neutral" then collectively this constitutes an additional optical state for the window unit.

Multi-Pane Electrochromic Windows

In this application, a "window unit" includes two substantially transparent substrates, for example, two panes of glass, where each substrate has at least one electrochromic device disposed thereon, and the panes have a separator disposed between them. Since an IGU may include more than two glass panes assembled into a unit, and for electrochromic windows specifically may include electrical leads for connecting the electrochromic glass to a voltage source, switches and the like, the term "window unit" is used to convey a more simple sub-assembly. That is, for the purposes of this invention, an IGU may include more components than a window unit. The most basic assembly of a window unit is two substrates, each with an electrochromic device thereon, and a sealing separator in between and registered with the two substrates.

The inventors have discovered that by using two or more electrochromic panes in a window unit, visual defects in any of the individual devices are negated by virtue of the extremely small likelihood that any of the visual defects will align perfectly and thus be observable to the user. Virtually any electrochromic device or devices can be used in combination, however, low-defect electrochromic devices as described above work particularly well. In one embodiment, all solid state low-defectivity electrochromic devices, one on each of two panes of an electrochromic window, are employed opposing each other in an IGU. In this way, there are virtually no detectable visual defects to the observer when, for example, both of the electrochromic panes are colored.

One embodiment is a window unit including: a first substantially transparent substrate and a first electrochromic device disposed thereon; a second substantially transparent substrate and a second electrochromic device disposed thereon; and a sealing separator between the first and second substantially transparent substrates, which sealing separator defines, together with the first and second substantially transparent substrates, an interior region that is thermally insulating.

Figure 1:
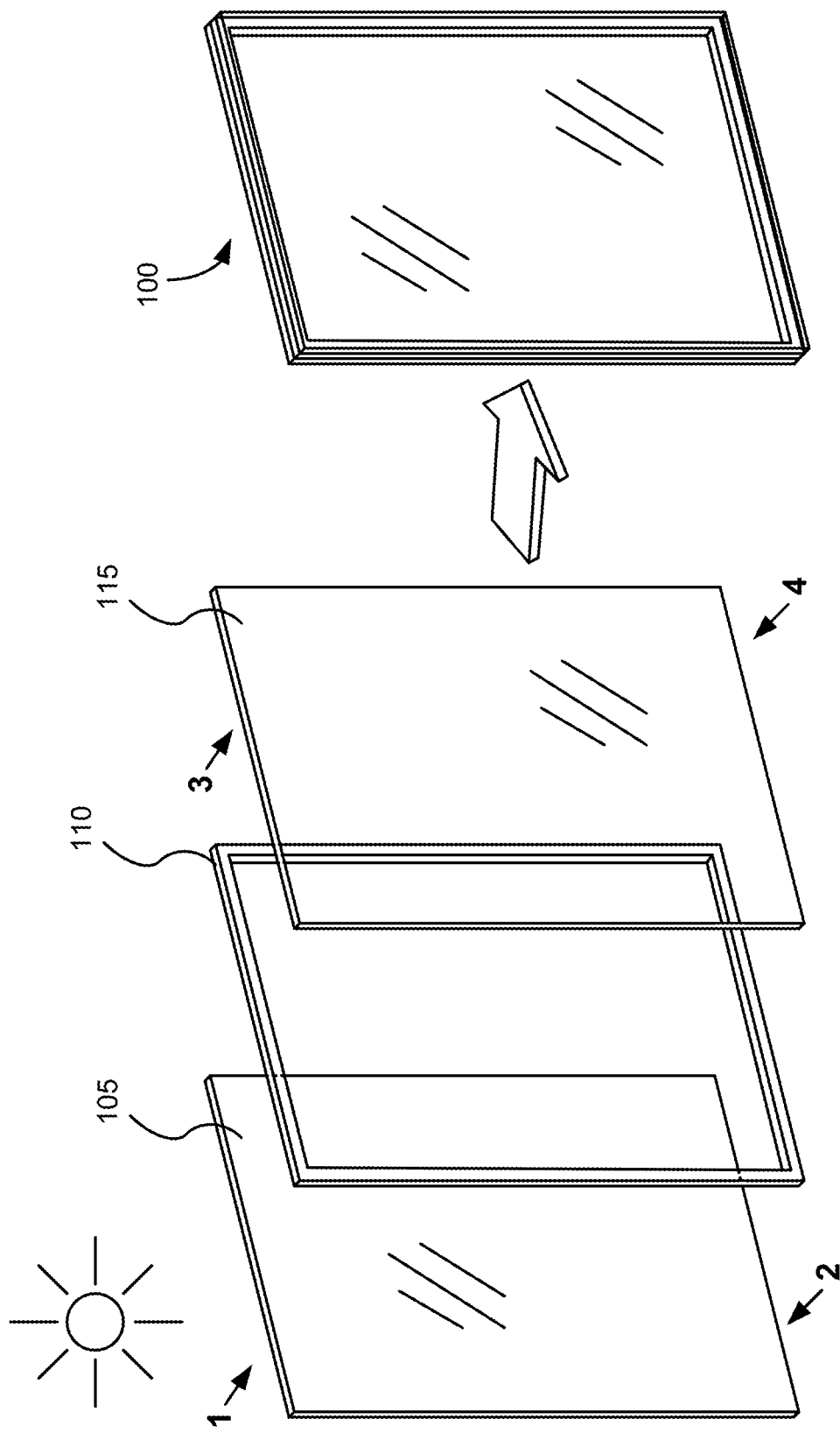
FIG. 1 depicts a perspective exploded view of a multi-pane window assembly.

FIG. 1 depicts a window unit, 100, having a first substantially transparent substrate, 105, a separator, 110, and a second substantially transparent substrate, 115. Each of substrates 105 and 115 has an electrochromic device (not shown) fabricated thereon. When the three components are combined, where separator 110 is sandwiched in between and registered with substrates 105 and 115, window unit 100 is formed. Window unit 100 has an associated interior space defined by the faces of the substrates in contact with the separator and the interior surfaces of the separator. Separator 110 is typically a sealing separator, that is, includes a spacer and sealing between the spacer and each substrate where they adjoin in order to hermetically seal the interior region and thus protect the interior from moisture and the like. As a convention, for two-pane window units described herein, the four viewable surfaces of the substrates are indicated numerically. Surface 1 is the surface of a substrate that is outside, for example, a room or building having such a window unit in a window installed in a wall thereof. A stylized sun is included to indicate that surface 1 would be exposed to, for example, the outside environment. Surface 2 is the other surface of the substrate that is inside the interior space of the window unit. Surface 3 is the surface of the second substrate that is inside the interior space of the window unit. Surface 4 is the other surface of the second substrate that is outside the interior space of the window unit but inside, for example, the aforementioned room or building. This convention does not negate using window units described herein for entirely interior spaces in buildings, however, there are particular advantages to using them on exterior walls of buildings because of their optic as well as thermally insulating properties.

"Substantially transparent substrates" include those described herein in relation to solid state inorganic electrochromic devices. That is, they are substantially rigid, for example glass or plexiglass. The substrates of a window unit need not be made of the same material, for example, one substrate may be plastic while the other is glass. In another example, one substrate may be thinner than the other substrate, for example, the substrate that would face the interior of a structure, that is not exposed to the environment, may be thinner than the substrate that would face the exterior of the structure. In one embodiment, the electrochromic device proximate the exterior environment, for example of a building, is better able to withstand environmental degradation than the second electrochromic device, which is proximate the interior of the building. In one embodiment, at least one of the first and second substantially transparent substrates includes architectural glass. In another embodiment, at least one of the first and second substantially transparent substrates further includes a low emissivity coating. In another embodiment, at least one of the first and second substantially transparent substrates further includes a UV and/or infrared (IR) absorber, and/or, a UV and/or IR reflective layer. In one embodiment, the UV and/or IR reflective and/or absorber layer is on surface 1, in another embodiment on surface 2, in yet another embodiment on surface 3, and in another embodiment on surface 4. In these embodiments, "on" a surface means on or associated with, considering that such layers or coatings may be either in direct contact with the surface of the pane and/or on top of, for example, the EC stack that is on the surface of the substrate. One embodiment is any window unit described herein where one or more of the EC devices has an UV and/or IR absorber and/or a UV and/or IR reflective layer thereon.

In one embodiment, at least one of the transparent conductive oxides of one of the electrochromic devices is configured so that it can be heated via application of electricity independently of operation of the electrochromic device to which it is a part. This is useful for a number of reasons, for example, preheating the EC device prior to transitioning and/or to create an insulating barrier to ameliorate heat loss from the interior of a building. Thus one embodiment is a window unit as described herein, where one of the transparent conductive oxides of one of the electrochromic devices is configured so that it can be heated via application of electricity independently of operation of the electrochromic device to which it is a part. One embodiment is a two-pane electrochromic window as described herein, where each pane has an EC device on its face in the interior region (surfaces 2 and 3) and a transparent conductive oxide of the EC device on surface 3 is configured for heating via application of electricity, said heating independently of operation of the EC device. Another embodiment is a two pane electrochromic window unit as described in relation to FIG. 1, where each of the two electrochromic devices has a TCO that is configured for heating, independent of operation of the device to which it is a component. This configuration is particularly useful in cold climates, where the outside pane is colder, the TCO can be heated, for example, prior to transitioning the device to which it is a part, so that the device's transition is aided by prewarming. The TCO of the device on the inner pane can also be heated, for example, to create a thermally insulating barrier which keeps heat in a building.

The electrochromic devices on each of the transparent substrates need not be of the same type. That is, one can be, for example, all inorganic and solid state while the other includes organic based electrochromic materials. In one embodiment, both electrochromic devices are all solid state and inorganic, and in another embodiment both electrochromic devices are also low-defectivity devices, for example low-defectivity all solid state and inorganic electrochromic devices as described herein. By registering two such electrochromic devices as described, window units are produced that are virtually free of visible defects when colored.

The electrochromic devices need not necessarily face each other in the interior region of the window unit (for example, on surfaces 2 and 3), but in one embodiment they do. This configuration is desirable because both electrochromic devices are protected from the outside environment in a sealed interior region of the window unit. It is also desirable for the electrochromic devices to extend over substantially the entire viewable region of the transparent substrate on which they reside.

Figure 2:
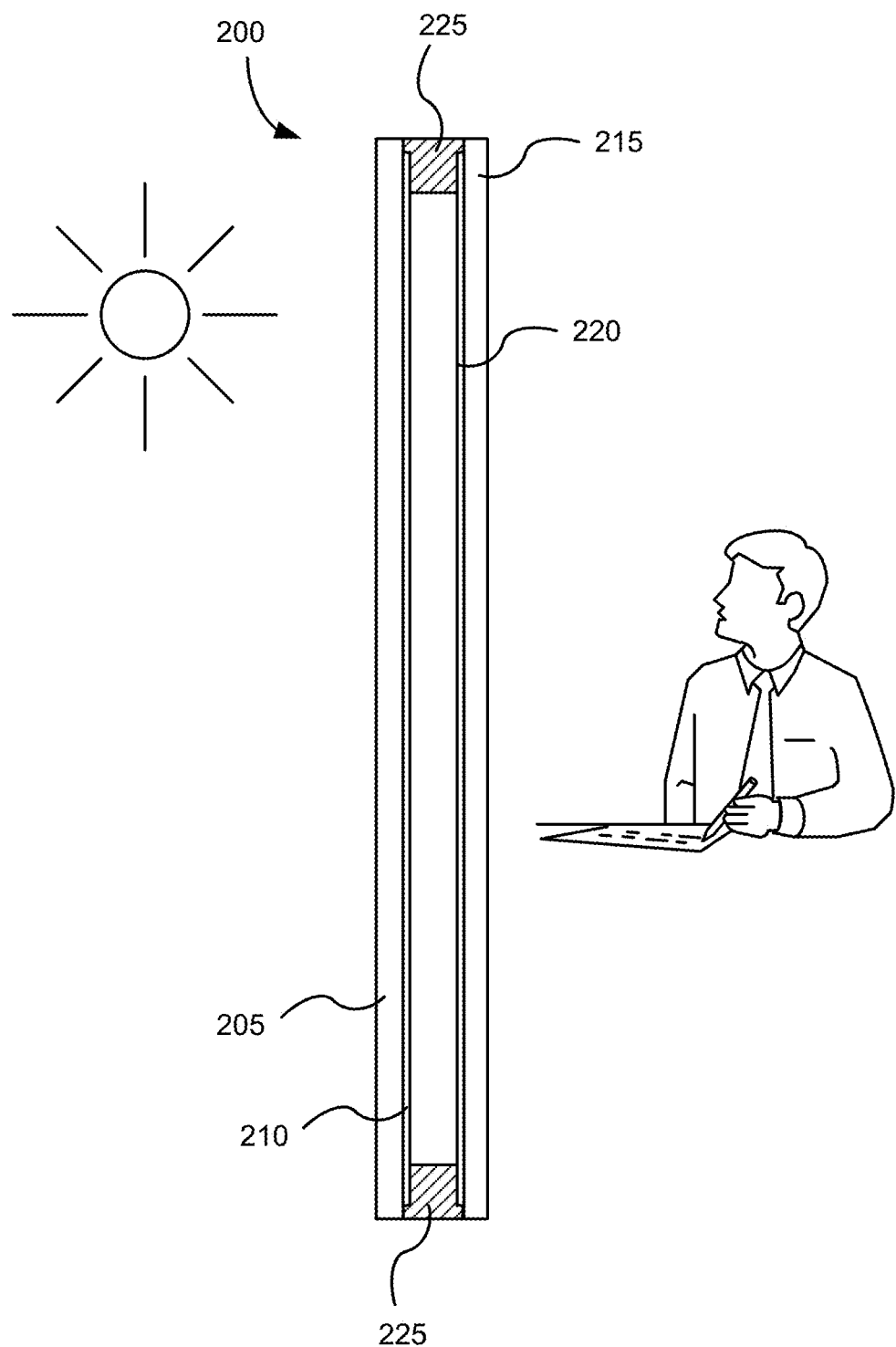
FIG. 2 depicts a cross-section of a multi-pane window assembly.

FIG. 2 depicts a cross-section of a window unit, 200, which includes an architectural glass pane, 205, with an electrochromic device, 210, disposed thereon. Window unit 200 also includes a second architectural glass pane, 215, with an electrochromic device, 220, disposed thereon. Devices 210 and 220 face each other in the interior region of window unit 200. A sealing separator, 225, seals the window unit, and in this example, overlaps the electrochromic devices. Electrical connections (not shown) might also pass through, or otherwise contact, separator 225. Separator 225 may have a unitary body or be made of multiple parts, for example, a rigid or semi-rigid spacer and one or more adhesives and/or sealing elements. In one example, separator 225 includes a spacer, such as a metal spacer, two seals that seal the areas where the spacer touches each of the panes, sometimes referred to as primary seals, and a seal around the outer perimeter of the spacer, and between the panes, sometimes called a secondary seal (for example a sealing adhesive). Separator 225 is simplified for the purposes of the description of FIG. 2.

As mentioned, due to the higher temperatures (due to absorption of radiant energy by an electrochromic device on the glass) that electrochromic window units may experience, more robust separators and sealants than those used in conventional IGU's may be necessary. Sealing separator 225 is disposed about peripheral regions of the first and second substantially transparent substrates without substantially obscuring a viewable region of the window unit (also, for example, as depicted in FIG. 1). In one embodiment, the sealing separator hermetically seals the interior region. The interior region of window unit 200 is typically, but not necessarily, charged with an inert gas such as argon or nitrogen. In one embodiment, the interior space is substantially liquid free. In one embodiment the interior space is charged with an inert gas and substantially liquid free. In one embodiment, the interior space is substantially moisture free, that is, having a moisture content of less than about <0.1 ppm. In another embodiment, the interior space would require at least about −40° C. to reach dew point (condensation of water vapor from the interior space), in another embodiment at least about −70° C.

Pane 205 of window unit 200 is depicted as facing the exterior environment (for example as illustrated by the sun's rays) while pane 215 is facing the interior of a structure, for example an office building, as illustrated by the outline figure of a man at work. In certain embodiments, it is desirable to fabricate window units where the inner and outer electrochromic devices, that is, the device proximate to the inside environment and the device proximate the outside environment, have different electrochromic states as far as transmissivity is concerned. In one embodiment, at least one of the first and second electrochromic devices is a two-state electrochromic device. In another embodiment, both of the first and second electrochromic devices are two-state electrochromic devices and, thus the window unit has four optical states. In one embodiment, such a window unit, when mounted, will have the first substantially transparent substrate facing outside a room or building and the second substantially transparent substrate will face inside the room or building, and where each of the first and second electrochromic devices has its own high transmissive state and low transmissive state, and where the transmittance of the second electrochromic device's low transmissive state is higher than the transmittance of the first electrochromic device's low transmissive state. In this context, the "device's" transmissive state means either the device itself or the combination of the transmissivity of the device and the substrate upon which it is deposited. That is, for example, most substrates have some inherent absorptive properties, for example, float glass alone typically has a transmissivity of about 92%.

One reason that it is desirable to have the first (exterior) device's low transmissive state is lower than the second (interior) device's low transmissive state, is that the device proximate the exterior can block more light (and therefore heat) transmission and thus ease the requirements of the interior device. For example, since the outer device filters out a good portion of the solar spectrum, the inner device is protected from degradation as compared to a device without such protection. So, the EC device on the inner pane, for example, need not be as robust, for example, all solid state and inorganic.

Another advantage to a multi-pane, for example a two-pane window with a device on each pane, is that neither device need have stringent lower transmissivity, for example less than 10% transmissivity, because the net transmissivity through the window unit is a product of both device's transmissivity. Yet another advantage is that each device can be thinner than either would otherwise be if the window unit had, and relied on, only a single electrochromic device. Thinner devices translates into less materials used which saves in manufacturing costs. Thinner devices also translate into faster response times during transition, which saves money, for example, by using less electricity and controlling heat load entering a room more quickly, and makes a more attractive window for the end user.

Another advantage of windows with more than one electrochromic pane, for example two electrochromic panes as described in relation to FIG. 2, is that electrical charge for powering the panes can be shared between the panes by a controller, for example, an appropriately programmed computer, which includes program instructions for carrying out charge sharing operations between the two electrochromic panes. Thus, one embodiment is a method of operating a multi-pane electrochromic window, including sharing electrical charge between panes of the multi-pane electrochromic window.

Still yet another advantage of a multi-pane electrochromic window unit relates to the curtaining effect. When electrochromic windows transition from dark to light, or light to dark, there is typically a transition period, that is, the transition is not instantaneous. During the transition, there can be visual anomalies and/or the transition is not uniform across the viewable surface of the window. For example, in a window where the bus bars that supply voltage to an electrochromic device, the bus bars may be arranged on opposite sides, for example, top and bottom, of the device in the IGU. When such a window transitions, for example, from light to dark, the device darkens as a function of the sheet resistance variation over the surface of the device. Thus the edges darken first, and there is a front, even or not, of darkening that emanates from each bus bar and travels toward the center of the window. The two fronts meet somewhere in the viewable region and eventually the window completes the transition to the dark state. This can detract from the appearance of the window during transitions. However, for example, with a dual pane electrochromic window with an electrochromic device on each pane, the transitions can be made to complement each other and minimize the curtaining effect. For example, if one pane's bus bars are on the top and bottom of the pane, and the other pane's bus bars are on either side of that pane, that is orthogonal to the first pane's busbars, then the transitions, for example when both devices are darkening, will complement each other so that more area darkens faster. In another example, a first pane's busbars are arranged so that the first panel darkens/lightens from the center out, while a second pane's busbars are arranged so the second panel darkens/lightens from perimeter inward. In this way the curtaining effect of each pane compliments the other, thereby minimizing the overall curtaining effect as viewed by the user.

In one embodiment, the two or more electrochromic devices of a multi-pane electrochromic window, each having two optical states, are coupled (active or not, concurrently) so that they are all on or all off. In this way, when on, no, or substantially no, visual defects are discernable to the naked eye. That is, their high and low transmissivity states are employed together, both high or both low. This is a two-state multi-pane electrochromic window. As noted, there is of course a neutral state, where there is no applied current, associated with each two-state device, and states where one or both panes have no applied current are meant to be included in the two-state window.

Another embodiment is a four-state multi-pane electrochromic window. In one embodiment, the four-state window has two panes, each with two-state electrochromic device. By virtue of each pane having a high and a low transmissivity state, when combined, there are four possible states for the electrochromic window which includes the electrochromic panes. An example of such a two-pane window unit device transmissivity configuration is illustrated in Table 1. In this example, each of the inner and outer window panes has two-states, on and off, each corresponding to a low and a high transmissivity state, respectively. For example, an inner pane has a high transmissivity of 80% and a low transmissivity of 20%, while an outer pane has a high transmissivity of 80% and a low transmissivity of 10%. Since each window pane's device has two optical states, that is a highly transmissive state and a low transmissive state, and they are combined in all possible ways, the window unit has four optical states.

As outlined in Table 1, for example, state 1 exists when the inner pane's electrochromic device is off and the outer pane's electrochromic device is off. Since both devices have an 80% transmissivity, when both electrochromic devices are off the net transmissivity through both panes is 64% (that is, 80% of 80%). So, when the window as a whole is drawing no power, the panes collectively allow 64% of the ambient light pass through the window unit. State 2 exists when the inner pane's device is on but the outer pane's device is off, thus allowing a net transmissivity of 16% (20% of 80%). State 3 exists when the inner pane's device is off but the outer pane's device is on, thus allowing a net transmissivity of 8% (80% of 10%). State 4 exists when the inner pane's device is on and the outer pane's device is on, thus allowing a net transmissivity of 2% (20% of 10%). Thus, a four-state electrochromic window allows a user to choose from four optical states, from highly transmissive, for example when one wants more light to enter a room, to very low transmissivity, for example when one wants the room to be dark, for example during a slide presentation. In state 1, there are no observable optical defects because neither of the electrochromic devices is in the dark state. In state 4, there are no observable optical defects because the likelihood of alignment of two defects, each on one of the devices, is extremely small, therefore one device's opacity necessarily blocks the other pane's optical defect.

The user can also choose two intermediate states of transmissivity which provides more flexibility than a simple two-state, that is light or dark/off or on, electrochromic window. Optical defects are also less likely to be observable in these two intermediate transmissivity states because, although one pane's device is off, the pane that is active is blocking, in this example, only 80% or 90% of the light transmissions that would otherwise pass through the window panes. The visibility of optical defects is proportional to the transmission and background of the window. Visible defects are most obvious when a very dark window is placed in front of a very bright background, that is, 1% Tvis window with a pinhole against direct sun. Because the window is not as dark, for example as in state 4 where 98% of the light is blocked, any optical defects present are less noticeable because they are not contrasted as highly as they would be when the electrochromic device is much darker. This is another advantage of configuring the device with the higher low transmissivity state as the inner pane, because there is less contrast between optical defects and the darkened portion of the device, for example in state 2 when the inner pane blocks 80% of the light, vs. state 3 when 90% of the light is blocked by the outer pane. During state 3, when 90% of the light is blocked by the outer pane, there is an additional inner pane through which any contrast would have to be observed by the user. The inner pane may impart some reflectivity and or refractive properties that would make observing optical defects in the outer pane in state 3 less likely. Nevertheless, low-defectivity windows also decrease the observable optical defects.

TABLE 1

| State | Inner Pane 80% high (off) 20% low (on) | Outer Pane 80% high (off) 10% low (on) | Net Transmissivity |
|---|---|---|---|
| 1 | off | off | 64% |
| 2 | on | off | 16% |
| 3 | off | on | 8% |
| 4 | on | on | 2% |

Figure 3:
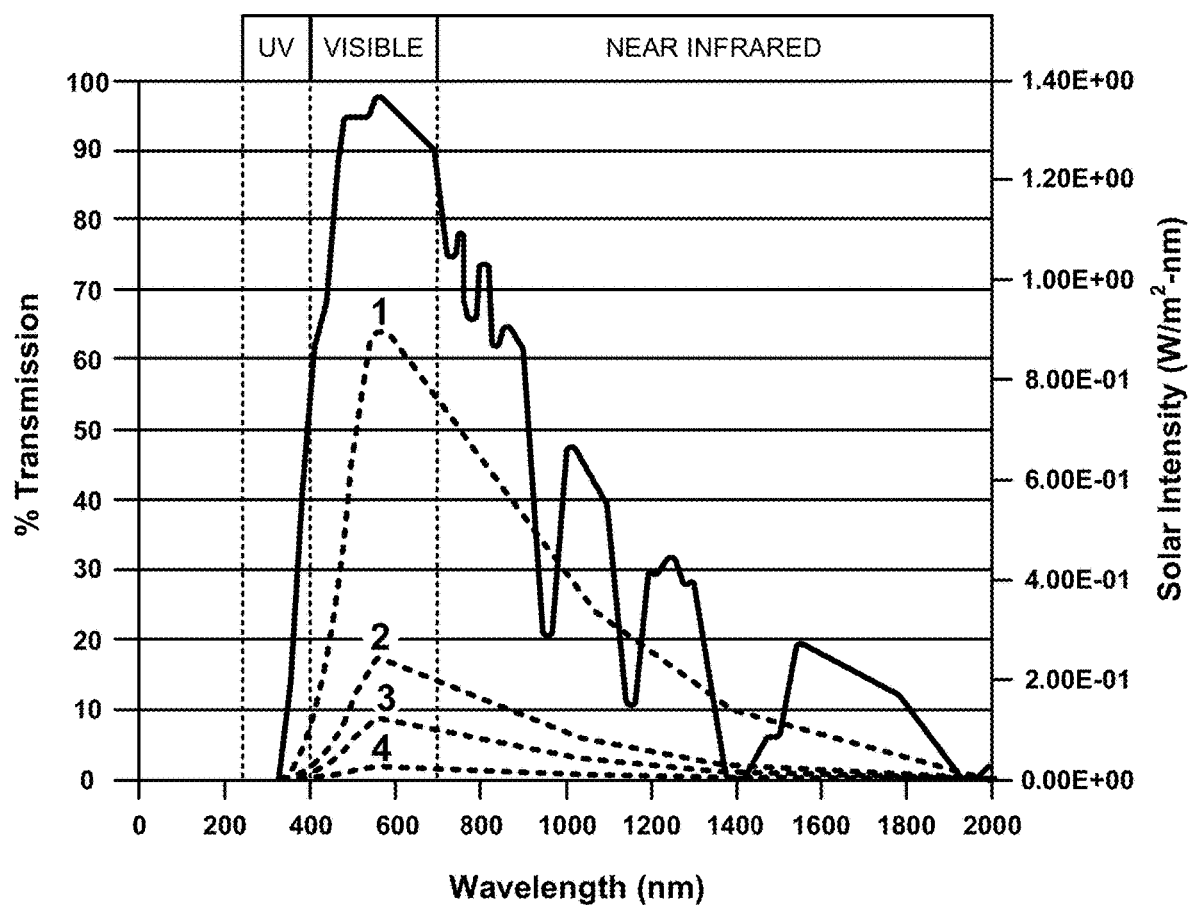
FIG. 3 is a graph of the solar spectrum and representative curves for a four-state multi-pane window assembly.

FIG. 3 is a graphical representation that approximates the solar spectrum (solid line). As can be seen, a significant amount of near infrared radiation passes through a standard window and thus unwanted heating of interiors of buildings having such windows occurs. Also depicted in FIG. 3 are transmissivity curves for the four optical states as described in relation to Table 1, each curve (dotted lines) labeled 1, 2, 3 and 4, respectively. For example, curve 1 has a maximum at about 550 nm in the visible range, which corresponds to the net transmissivity of 64% (state 1), that is, the light level the user would actually observe through the window unit. State 1 allows a substantial amount of light to pass through the window unit, and also a significant portion of the near infrared spectrum, which allows passive solar heating if desired. This is in contrast to a typical low-E coating which, although allows a comparable amount of visible light to pass through, blocks most of the near infrared spectrum and does not allow passive solar heating in the winter (although embodiments described herein include low-E coatings). States 2-4 allow much less light in, but also much less of the near infrared spectrum, and thus unwanted interior heating is drastically reduced, for example, allowing savings on energy used to cool a building during hot summer months. Thus it is desirable to have more than two-states for electrochromic windows, the intermediate states allow for tailored light and/or heat control as desired. Electrochromic window units as described herein also reduce a significant amount of the ultraviolet spectrum from entering the interior of a building.

Thus one embodiment is a window unit where the transmittance of the first (outer) electrochromic device's low transmissive state is between about 5% and about 15%, and the first electrochromic devices' high transmissive state is between about 75% and about 95%; and the transmittance of the second (inner) electrochromic device's low transmissive state is between about 20% and about 30%, and the second electrochromic devices' high transmissive state is between about 75% and about 95%. In one embodiment, as a product of two device's high and low transmissivity values, a window unit has four optical states of: i) overall (net) transmittance of between about 60% and about 90%; ii) overall transmittance of between about 15% and about 30%; iii) overall transmittance of between about 5% and about 10%; and iv) overall transmittance of between about 0.1% and about 5%.

In one embodiment, both of the first and second substantially transparent substrates are architectural glass. By using two low-defectivity electrochromic devices, even on architectural scale glass substrates, registered for example as in FIGS. 1 and 2, the window unit has virtually no visible defects. One embodiment is an IGU constructed from a window unit described herein. Architectural glass window units are particularly desirable due to the large demand for controlling energy costs in large buildings.

One embodiment is an IGU including: a first pane of architectural glass including a first electrochromic device disposed thereon; a second pane of architectural glass including a second electrochromic device disposed thereon; a sealing separator between the first and second panes, which sealing separator defines, together with the first and second panes, an interior region between the first and second panes; and an inert gas or vacuum in the interior region; where both the first electrochromic device and the second electrochromic device are in the interior region. One or both of the panes in the IGU can have a Low-E coating. In one embodiment, both the first electrochromic device and the second electrochromic device are entirely solid state and inorganic. In another embodiment, both of the first and second electrochromic devices are two-state electrochromic devices and the IGU has four optical states. In one embodiment, the four optical states are: i) overall transmittance of between about 60% and about 90%; ii) overall transmittance of between about 15% and about 30%; iii) overall transmittance of between about 5% and about 10%; and iv) overall transmittance of between about 0.1% and about 5%. In one embodiment, the IGU has no visible defects.

In accord with the device embodiments described are complementary methods. One embodiment is a method of providing a gradation of transmissivity in an electrochromic window, including: (i) combining a first electrochromic window pane and a second electrochromic window pane into an IGU, wherein each of the first and second electrochromic panes has two optical states, a high transmissivity and a low transmissivity; and (ii) operating the two electrochromic window panes in four modes, including: 1. both panes at their high transmissivity; 2. the first electrochromic window pane at its low transmissivity and the second electrochromic window pane at its high transmissivity; 3. the first electrochromic window pane at its high transmissivity and the second electrochromic window pane at its low transmissivity; and 4. both panes at their low transmissivity. In one embodiment, the first electrochromic window pane is the inner pane of the electrochromic window and the second electrochromic window pane is the outer pane of the electrochromic window, and the first electrochromic pane's low transmissivity is greater than the second electrochromic window pane's low transmissivity.

One embodiment is a multi-pane electrochromic window where each pane includes an electrochromic device and where at least one of the electrochromic devices has intermediate state capability, that is, can achieve variable coloring states between the extreme end states, that is, fully darkened and fully lightened states. The value of this embodiment is a wider dynamic range of states, rather than "digital" states as described, for example, with respect to Table 1. In one embodiment, the window unit has two panes of glass, in another embodiment, three panes of glass.

Another aspect of the invention is a multipane EC window unit having one or more EC devices, each on a separate pane of the window unit, the window unit including a pane that does not have an EC device, but that does include at least a heatable transparent conductive oxide. In one embodiment, the "TCO-only" pane of the window unit can also include UV and/or IR absorbing and/or reflecting coatings, lowE coatings and the like. As described herein, the transparent conductive oxide can be heated via, for example, busbars which supply electricity to run a current through the transparent conductive oxide. In one embodiment, the window unit has three panes, two each with their own EC device, and a third pane with the heatable transparent conductive oxide. In one embodiment, the order of the panes is a first pane with an EC device, a second pane with an EC device, and then the third pane with the heatable TCO. In one embodiment, the first and second panes, each with an EC device, can be configured so that the EC devices are, with reference to the surfaces in FIG. 1, for example, on surfaces 2 and 3, or, for example, on surfaces 2 and 4; in combination with the TCO on the third pane facing, for example, surface 4. That is, second EC pane and the TCO only pane, along with a separator as described herein, for a second interior region where the EC device of the second pane and the TCO of the TCO-only pane are in the second interior region. In one example, the third pane is the inner most pane in the interior of a building when the window unit is installed. In another example the third pane is in between the first and second panes, each of which have an EC device thereon.

Figure 4:
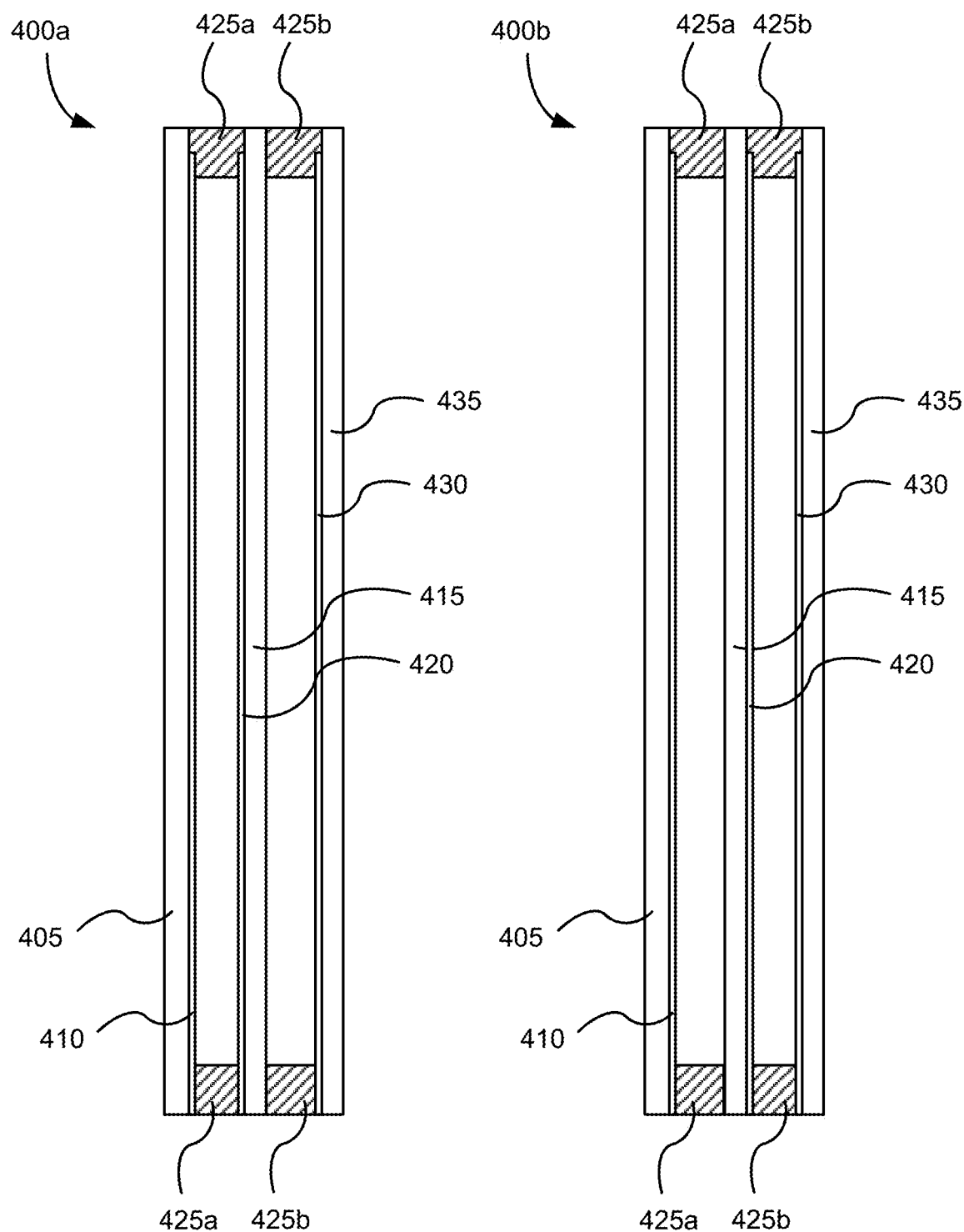
FIG. 4 is a schematic cross-section of a multi-pane window assembly.

FIG. 4 illustrates two configurations of a three-pane window unit having two EC panes, each with an EC device, and a third pane with a heatable TCO. Configuration 400*a* shows a first pane (as described herein) 405, with an EC device (as described herein), 410. A separator (as described herein), 425*a*, separates and seals a first inner region between pane 405 and pane 415. Pane 415 has an EC device, 420, thereon. A second separator, 425*b*, separates and seals a second inner region, between pane 415 and a third pane, 435, which has a heatable TCO, 430, thereon. In configuration 400*b*, EC device 420 is in the second interior space, opposite and facing TCO 430. One of ordinary skill in the art would appreciate that the EC devices or the TCO can be on faces of the panes that are exposed to ambient conditions, rather than an interior region, without escaping the scope of the invention.

Another embodiment is window unit as described in relation to FIG. 4, but where each of 410, 420 and 430 are each electrochromic devices as described herein. In one embodiment, devices 410 and 430 are all solid state and inorganic, and device 420 is an organic based EC device, either on a glass substrate or a polymeric film. In another embodiment all three EC devices are all solid state and inorganic.

Another embodiment is a window unit as described in relation to FIG. 4, but where 420 and 415 are replaced with a UV and/or IR absorber and/or reflective film and the outer two panes are EC device panes as described herein. For example, one embodiment is a window unit with two EC panes and one or more UV and/or IR absorber and/or reflective films disposed in the interior space. The configuration in FIG. 4 (with two spacers) is one way to implement this embodiment.

One embodiment is a window unit as described herein where a transparent conductive oxide of at least one of the EC devices is heatable, for example, via application of electricity to resistively heat the TCO. One embodiment is a two-pane electrochromic window as described herein, where each pane has an EC device on its face in the interior region (surfaces 2 and 3 as described in relation to FIG. 1) and at least one transparent conductive oxide of one of the EC devices is configured for heating via application of electricity, said heating independently of operation of the EC device. When installed in a building where one pane is exposed to the outside and the other exposed to the inside, this heatable TCO can be on the side facing the interior or the exterior of the building. As described above, when two heatable TCO's are used there are associated insulative and EC transition benefits.

Another aspect is a multipane EC window unit, having two panes (substrates) where the first substrate has an electrochromic device, the second transparent substrate does not, but the second substrate does include a transparent conductive oxide, for example indium tin oxide, that can be heated, for example via application of electricity applied via busbars. In one example, the window unit is configured analogously to that depicted in FIG. 2, but where, for example, 220 is not an EC device, but rather a heatable TCO. Thus one embodiment is a window unit including: a first substantially transparent substrate and an electrochromic device disposed thereon; a second substantially transparent substrate and a heatable transparent conductive oxide layer thereon; and a sealing separator between the first and second substantially transparent substrates, which sealing separator defines, together with the first and second substantially transparent substrates, an interior region that is thermally insulating. In one embodiment, the electrochromic device and the heatable transparent conductive oxide are both in the interior region. In one embodiment, the second substantially transparent substrate comprises an infrared reflective and/or infrared absorbing coating. In one embodiment, the electrochromic device is all solid state and inorganic.

The advantages to the above configurations include: 1) improved insulating properties (U value), 2) more flexibility in the materials used for the suspended film (i.e. organic based) as some UV/IR filtering would occur through, for example, a first, more robust inorganic device, which would allow use of less robust organic devices in the interior region of the window unit, and 3) utilizing an transparent conducting oxide as a heating element for insulating and/or aiding in EC transitions, for example, at low temperature conditions, to stem heat loss through the window, for example, during the night and/or cooler weather.

Another embodiment is a method of changing between multiple optical states in a window unit, including: (i) changing the optical state of a first electrochromic device of a first substantially transparent substrate without changing the optical state of a second electrochromic device on a second substantially transparent substrate, where the window unit includes the first and second substantially transparent substrates connected by a sealing separator that defines, together with the first and second substantially transparent substrates, an interior region; and (ii) changing the optical state of the second electrochromic device without changing the optical state of the first electrochromic device. This method can further include changing the optical state of the first electrochromic device concurrently with changing the optical state of the second electrochromic device. By combining these actions, a window unit has multiple optical states for the end user.

Another embodiment is a method of fabricating a window unit, the method including: arranging, substantially parallel to each other, a first substantially transparent substrate with a first electrochromic device disposed thereon and a second substantially transparent substrate with a second electrochromic device disposed thereon; and installing a sealing separator between the first and second substantially transparent substrates, which sealing separator defines, together with the first and second substantially transparent substrates, an interior region, the interior region thermally insulating. In one embodiment, at least one of the first and second substantially transparent substrates includes architectural glass. In one embodiment, at least one of the first and second substantially transparent substrates further includes a low emissivity coating. In another embodiment, both the first and second electrochromic devices face the interior region. In one embodiment, at least one of the first and second electrochromic devices is a two-state electrochromic device, in another embodiment, both of the first and second electrochromic devices are two-state electrochromic devices and the window unit has four optical states. In one embodiment, at least one of the first and second electrochromic devices is an entirely solid state and inorganic device. In one embodiment, the transmittance of the first electrochromic device's low transmissive state is between about 5% and about 15%, and the first electrochromic devices' high transmissive state is between about 75% and about 95%; and the transmittance of the second electrochromic device's low transmissive state is between about 20% and about 30%, and the second electrochromic devices' high transmissive state is between about 75% and about 95%. In one embodiment, the four optical states are: i) overall transmittance of between about 60% and about 90%; ii) overall transmittance of between about 15% and about 30%; iii) overall transmittance of between about 5% and about 10%; and iv) overall transmittance of between about 0.1% and about 5%. The sealing separator hermetically seals the interior region and the interior region can contain an inert gas or vacuum and/or be substantially liquid free. In one embodiment, the window unit has no visible defects. In another embodiment, the window unit is an IGU.

Another embodiment is a method of fabricating an IGU, the method including: arranging a first pane of architectural glass and a second pane of architectural glass in a substantially parallel arrangement, where the first pane includes a first electrochromic device disposed thereon, and the second pane includes a second electrochromic device disposed thereon; installing a sealing separator between the first and second panes, which sealing separator defines, together with the first and second panes, an interior region between the first and second panes, the interior region thermally insulating; and charging the interior region with an inert gas; where the first electrochromic device and the second electrochromic device are in the interior region and are both entirely solid state and inorganic. In one embodiment, at least one of the first and second panes further includes a low emissivity coating. In another embodiment, both of the first and second electrochromic devices are two-state electrochromic devices and the IGU has four optical states. In one embodiment, the four optical states are: i) overall transmittance of between about 60% and about 90%; ii) overall transmittance of between about 15% and about 30%; iii) overall transmittance of between about 5% and about 10%; and iv) overall transmittance of between about 0.1% and about 5%. In one embodiment, the IGU has no visible defects.

As described, virtually any electrochromic device will work with this invention. In some embodiments, more than one type of electrochromic device is used in a window unit, for example, a more robust electrochromic device is used on an outer pane while a less robust device is used on an inner pane. Particularly well suited for this invention are all solid state and inorganic electrochromic devices. Thus, for context and in relation to embodiments that include such devices, electrochromic device technology is described below in relation to two types of all solid state and inorganic electrochromic devices, particularly low-defectivity all solid state and inorganic electrochromic devices. Because of their low defectivity and robust nature, these devices are particularly well suited for embodiments described herein. One embodiment of the invention is any described embodiment including one or more electrochromic devices, where the one or more electrochromic devices are selected from the first and second types described below. In a particular embodiment, the one or more electrochromic devices are low-defectivity devices, where the defectivity level is defined below. The first type are devices having distinct material layers in the electrochromic stack, the second type are devices having an ion conducting electronically insulating interfacial region which serves the function of a distinct ion conducting layer as in the first type.

Low-Defectivity Solid State and Inorganic Electrochromic Devices Having Distinct Layers FIG. 5 depicts a schematic cross-section of an electrochromic device, 500. Electrochromic device 500 includes a substrate, 502, a conductive layer (CL), 504, an electrochromic layer (EC), 506, an ion conducting layer (IC), 508, a counter electrode layer (CE), 510, and a conductive layer (CL), 514. Layers 504, 506, 508, 510, and 514 are collectively referred to as an electrochromic stack, 520. A voltage source, 516, operable to apply an electric potential across electrochromic stack 520, effects the transition of the electrochromic device from, for example, a bleached state to a colored state (depicted). The order of layers can be reversed with respect to the substrate.

Electrochromic devices having distinct layers as described can be fabricated as all solid state and inorganic devices with low defectivity. Such all solid-state and inorganic electrochromic devices, and methods of fabricating them, are described in more detail in U.S. patent application Ser. No. 12/645,111, entitled, "Fabrication of Low-Defectivity Electrochromic Devices," filed on Dec. 22, 2009 and naming Mark Kozlowski et al. as inventors, and in U.S. patent application Ser. No. 12/645,159, entitled, "Electrochromic Devices," filed on Dec. 22, 2009 and naming Zhongchun Wang et al. as inventors, both of which are incorporated by reference herein for all purposes.

It should be understood that the reference to a transition between a bleached state and colored state is non-limiting and suggests only one example, among many, of an electrochromic transition that may be implemented. Unless otherwise specified herein, whenever reference is made to a bleached-colored transition, the corresponding device or process encompasses other optical state transitions such non-reflective-reflective, transparent-opaque, etc. Further the term "bleached" refers to an optically neutral state, for example, uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In certain embodiments, the electrochromic device reversibly cycles between a bleached state and a colored state. In the bleached state, a potential is applied to the electrochromic stack 520 such that available ions in the stack that can cause the electrochromic material 506 to be in the colored state reside primarily in the counter electrode 510. When the potential on the electrochromic stack is reversed, the ions are transported across the ion conducting layer 508 to the electrochromic material 506 and cause the material to enter the colored state. A more detailed description of the transition from bleached to colored state, and from colored to bleached state, is described below.

In certain embodiments, all of the materials making up electrochromic stack 520 are inorganic, solid (that is, in the solid state), or both inorganic and solid. Because organic materials tend to degrade over time, inorganic materials offer the advantage of a reliable electrochromic stack that can function for extended periods of time. Materials in the solid state also offer the advantage of not having containment and leakage issues, as materials in the liquid state often do. Each of the layers in the electrochromic device is discussed in detail, below. It should be understood that any one or more of the layers in the stack may contain some amount of organic material, but in many implementations one or more of the layers contains little or no organic matter. The same can be said for liquids that may be present in one or more layers in small amounts. It should also be understood that solid state material may be deposited or otherwise formed by processes employing liquid components such as certain processes employing sol-gels or chemical vapor deposition.

Referring again to FIG. 5, voltage source 516 is typically a low voltage electrical source and may be configured to operate in conjunction with radiant and other environmental sensors. Voltage source 516 may also be configured to interface with an energy management system, such as a computer system that controls the electrochromic device according to factors such as the time of year, time of day, and measured environmental conditions. Such an energy management system, in conjunction with large area electrochromic devices (that is, an electrochromic window), can dramatically lower the energy consumption of a building. As will be apparent from the description of multi-pane electrochromic windows described herein, particular energy savings on heating and cooling are realized.

Any material having suitable optical, electrical, thermal, and mechanical properties may be used as substrate 502. Such substrates include, for example, glass, plastic, and mirror materials. Suitable plastic substrates include, for example acrylic, polystyrene, polycarbonate, allyl diglycol carbonate, SAN (styrene acrylonitrile copolymer), poly(4-methyl-1-pentene), polyester, polyamide, etc. If a plastic substrate is used, it is preferably barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, including soda lime float glass. The glass may be tempered or untempered. In some embodiments of electrochromic device 500 with glass, for example soda lime glass, used as substrate 502, there is a sodium diffusion barrier layer (not shown) between substrate 502 and conductive layer 504 to prevent the diffusion of sodium ions from the glass into conductive layer 504.

In some embodiments, the optical transmittance (that is, the ratio of transmitted radiation or spectrum to incident radiation or spectrum) or "transmissivity" of substrate 502 is about 40 to 95%, for example, about 90-92%. The substrate may be of any thickness, as long as it has suitable mechanical properties to support the electrochromic stack 520. While substrate 502 may be of virtually any suitable thickness, in some embodiments, it is about 0.01 mm to 10 mm thick, preferably about 3 mm to 9 mm thick. Multi-pane window units described herein may have individual panes of different thickness. In one embodiment, an inner (proximate to the interior of a structure) pane is thinner than an outer (proximate to the external environment) pane that must withstand more extreme exposure.

In some embodiments, the substrate is architectural glass. Architectural glass is glass that is used as a building material. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, for example, as large as about 72 inches by 120 inches. Architectural glass is typically at least about 2 mm thick. Architectural glass that is less than about 3.2 mm thick cannot be tempered. In some embodiments with architectural glass as the substrate, the substrate may still be tempered even after the electrochromic stack has been fabricated on the substrate. In some embodiments with architectural glass as the substrate, the substrate is a soda lime glass from a tin float line. The percent transmission over the visible spectrum of an architectural glass substrate (that is, the integrated transmission across the visible spectrum) is generally greater than 80% for neutral substrates, but it could be lower for colored substrates. Preferably, the percent transmission of the substrate over the visible spectrum is at least about 90% (for example, about 90-92%). The visible spectrum is the spectrum that a typical human eye will respond to, generally about 380 nm (purple) to about 780 nm (red). In some cases, the glass has a surface roughness of between about 10 and 30 nm.

On top of substrate 502 is conductive layer 504. In certain embodiments, one or both of the conductive layers 504 and 514 is inorganic and/or solid. Conductive layers 504 and 514 may be made from a number of different materials, including conductive oxides, thin metallic coatings, conductive metal nitrides, and composite conductors. Typically, conductive layers 504 and 514 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used. Examples of metals used for such thin metallic coatings include transition metals including gold, platinum, silver, aluminum, nickel alloy, and the like. Thin metallic coatings based on silver, well known in the glazing industry, are also used. Examples of conductive nitrides include titanium nitrides, tantalum nitrides, titanium oxynitrides, and tantalum oxynitrides. The conductive layers 504 and 514 may also be composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (for example, about 100 □m or thinner).

In some embodiments, commercially available substrates such as glass substrates contain a transparent conductive layer coating. Such products may be used for both substrate 502 and conductive layer 504. Examples of such glasses include conductive layer coated glasses sold under the trademark TEC Glass™ by Pilkington of Toledo, Ohio, and SUNGATE™ 300 and SUNGATE™ 500 by PPG Industries of Pittsburgh, Pa. TEC Glass™ is a glass coated with a fluorinated tin oxide conductive layer. Indium tin oxide is also a commonly used substantially transparent conductive layer.

In some embodiments, the same conductive layer is used for both conductive layers (that is, conductive layers 504 and 514). In some embodiments, different conductive materials are used for each conductive layer 504 and 514. For example, in some embodiments, TEC Glass™ is used for substrate 502 (float glass) and conductive layer 504 (fluorinated tin oxide) and indium tin oxide is used for conductive layer 514. As noted above, in some embodiments employing TEC Glass™ there is a sodium diffusion barrier between the glass substrate 502 and TEC conductive layer 504 because float glass may have a high sodium content.

In some implementations, the composition of a conductive layer, as provided for fabrication, should be chosen or tailored based on the composition of an adjacent layer (for example, electrochromic layer 506 or counter electrode layer 510) in contact with the conductive layer. For metal oxide conductive layers, for example, conductivity is a function of the number of oxygen vacancies in the conductive layer material, and the number of oxygen vacancies in the metal oxide is impacted by the composition of the adjacent layer. Selection criteria for a conductive layer may also include the material's electrochemical stability and ability to avoid oxidation or more commonly reduction by a mobile ion species.

The function of the conductive layers is to spread an electric potential provided by voltage source 516 over surfaces of the electrochromic stack 520 to interior regions of the stack, with very little ohmic potential drop. The electric potential is transferred to the conductive layers though electrical connections to the conductive layers. In some embodiments, bus bars, one in contact with conductive layer 504 and one in contact with conductive layer 514, provide the electric connection between the voltage source 516 and the conductive layers 504 and 514. The conductive layers 504 and 514 may also be connected to the voltage source 516 with other conventional means.

In some embodiments, the thickness of conductive layers 504 and 514 is between about 5 nm and about 10,000 nm. In some embodiments, the thickness of conductive layers 504 and 514 are between about 10 nm and about 1,000 nm. In other embodiments, the thickness of conductive layers 504 and 514 are between about 10 nm and about 500 nm. In some embodiments where TEC Glass™ is used for substrate 502 and conductive layer 504, the conductive layer is about 400 nm thick. In some embodiments where indium tin oxide is used for conductive layer 514, the conductive layer is about 100 nm to 400 nm thick (280 nm in one embodiment). More generally, thicker layers of the conductive material may be employed so long as they provide the necessary electrical properties (for example, conductivity) and optical properties (for example, transmittance). Generally, the conductive layers 504 and 514 are as thin as possible to increase transparency and to reduce cost. In some embodiment, conductive layers are substantially crystalline. In some embodiment, conductive layers are crystalline with a high fraction of large equiaxed grains The thickness of the each conductive layer 504 and 514 is also substantially uniform. Smooth layers (that is, low roughness, Ra) of the conductive layer 504 are desirable so that other layers of the electrochromic stack 520 are more compliant. In one embodiment, a substantially uniform conductive layer varies by no more than about +10% in each of the aforementioned thickness ranges. In another embodiment, a substantially uniform conductive layer varies by no more than about ±5% in each of the aforementioned thickness ranges. In another embodiment, a substantially uniform conductive layer varies by no more than about ±2% in each of the aforementioned thickness ranges.

The sheet resistance ($R_s$) of the conductive layers is also important because of the relatively large area spanned by the layers. In some embodiments, the sheet resistance of conductive layers 504 and 514 is between about 5 Ohms per square to about 30 Ohms per square. In some embodiments, the sheet resistance of conductive layers 504 and 514 is about 15 Ohms per square. In general, it is desirable that the sheet resistance of each of the two conductive layers be about the same. In one embodiment, the two layers each have a sheet resistance of between about 10 and about 15 Ohms per square.

Overlaying conductive layer 504 is electrochromic layer 506. In embodiments, electrochromic layer 506 is inorganic and/or solid, in typical embodiments inorganic and solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. In some embodiments, the metal oxide is doped with one or more dopants such as lithium, sodium, potassium, molybdenum, vanadium, titanium, and/or other suitable metals or compounds containing metals. Mixed oxides (for example, W—Mo oxide, W—V oxide) are also used in certain embodiments. An electrochromic layer 506 comprising a metal oxide is capable of receiving ions transferred from counter electrode layer 510.

In some embodiments, tungsten oxide or doped tungsten oxide is used for electrochromic layer 506. In one embodiment, the electrochromic layer is made substantially of $WO_x$, where "x" refers to an atomic ratio of oxygen to tungsten in the electrochromic layer, and x is between about 2.7 and 3.5. It has been suggested that only sub-stoichiometric tungsten oxide exhibits electrochromism; that is, stoichiometric tungsten oxide, $WO_3$, does not exhibit electrochromism. In a more specific embodiment, $WO_x$, where x is less than 3.0 and at least about 2.7 is used for the electrochromic layer. In another embodiment, the electrochromic layer is $WO_x$, where x is between about 2.7 and about 2.9. Techniques such as Rutherford Backscattering Spectroscopy (RBS) can identify the total number of oxygen atoms which include those bonded to tungsten and those not bonded to tungsten. In some instances, tungsten oxide layers where x is 3 or greater exhibit electrochromism, presumably due to unbound excess oxygen along with sub-stoichiometric tungsten oxide. In another embodiment, the tungsten oxide layer has stoichiometric or greater oxygen, where x is 3.0 to about 3.5.

In certain embodiments, the tungsten oxide is crystalline, nanocrystalline, or amorphous. In some embodiments, the tungsten oxide is substantially nanocrystalline, with grain sizes, on average, from about 5 nm to about 50 nm (or from about 5 nm to about 20 nm), as characterized by transmission electron microscopy (TEM). The tungsten oxide morphology may also be characterized as nanocrystalline using x-ray diffraction (XRD). For example, nanocrystalline electrochromic tungsten oxide may be characterized by the following XRD features: a crystal size of about 10 nm to about 100 nm (for example, about 55 nm). Further, nanocrystalline tungsten oxide may exhibit limited long range order, for example, on the order of several (about 5 to about 20) tungsten oxide unit cells.

The thickness of the electrochromic layer 506 depends on the electrochromic material selected for the electrochromic layer. In some embodiments, the electrochromic layer 506 is about 50 nm to 2,000 nm, or about 200 nm to 700 nm. In some embodiments, the electrochromic layer is about 300 nm to about 500 nm. The thickness of the electrochromic layer 506 is also substantially uniform. In one embodiment, a substantially uniform electrochromic layer varies only about ±10% in each of the aforementioned thickness ranges. In another embodiment, a substantially uniform electrochromic layer varies only about ±5% in each of the aforementioned thickness ranges. In another embodiment, a substantially uniform electrochromic layer varies only about ±3% in each of the aforementioned thickness ranges.

Generally, in electrochromic materials, the colorization (or change in any optical property—for example, absorbance, reflectance, and transmittance) of the electrochromic material is caused by reversible ion insertion into the material (for example, intercalation) and a corresponding injection of a charge balancing electron. Typically some fraction of the ion responsible for the optical transition is irreversibly bound up in the electrochromic material. As explained below some or all of the irreversibly bound ions are used to compensate "blind charge" in the material. In most electrochromic materials, suitable ions include lithium ions ($Li^+$) and hydrogen ions ($H^+$) (that is, protons). In some cases, however, other ions will be suitable. These include, for example, deuterium ions ($D^+$), sodium ions ($Na^+$), potassium ions ($K^+$), calcium ions ($Ca^{++}$), barium ions ($Ba^{++}$), strontium ions ($Sr^{++}$), and magnesium ions ($Mg^{++}$). In various embodiments described herein, lithium ions are used to produce the electrochromic phenomena. Intercalation of lithium ions into tungsten oxide ($WO_{3-y}$ ($0<y\leq\sim0.3$)) causes the tungsten oxide to change from transparent (bleached state) to blue (colored state).

Referring again to FIG. 5, in electrochromic stack 520, ion conducting layer 508 overlays electrochromic layer 506. On top of ion conducting layer 508 is counter electrode layer 510. In some embodiments, counter electrode layer 510 is inorganic and/or solid. The counter electrode layer may comprise one or more of a number of different materials that are capable of serving as reservoirs of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), Prussian blue. Optically passive counter electrodes comprise cerium titanium oxide ($CeO_2$—$TiO_2$), cerium zirconium oxide ($CeO_2$—$ZrO_2$), nickel oxide (NiO), nickel-tungsten oxide (NiWO), vanadium oxide ($V_2O_5$), and mixtures of oxides (for example, a mixture of $Ni_2O_3$ and $WO_3$). Doped formulations of these oxides may also be used, with dopants including, for example, tantalum and tungsten. Because counter electrode layer 510 contains the ions used to produce the electrochromic phenomenon in the electrochromic material when the electrochromic material is in the bleached state, the counter electrode preferably has high transmittance and a neutral color when it holds significant quantities of these ions.

In some embodiments, nickel-tungsten oxide (NiWO) is used in the counter electrode layer. In certain embodiments, the amount of nickel present in the nickel-tungsten oxide can be up to about 90% by weight of the nickel-tungsten oxide. In a specific embodiment, the mass ratio of nickel to tungsten in the nickel-tungsten oxide is between about 4:6 and 6:4 (for example, about 1:1). In one embodiment, the NiWO is between about 15% (atomic) Ni and about 60% Ni; between about 10% W and about 40% W; and between about 30% O and about 75% O. In another embodiment, the NiWO is between about 30% (atomic) Ni and about 45% Ni; between about 10% W and about 25% W; and between about 35% O and about 50% O. In one embodiment, the NiWO is about 42% (atomic) Ni, about 14% W, and about 44% O.

When charge is removed from a counter electrode 510 made of nickel tungsten oxide (that is, ions are transported from the counter electrode 510 to the electrochromic layer 506), the counter electrode layer will turn from a transparent state to a brown colored state.

The counter electrode morphology may be crystalline, nanocrystalline, or amorphous. In some embodiments, where the counter electrode layer is nickel-tungsten oxide, the counter electrode material is amorphous or substantially amorphous. Substantially amorphous nickel-tungsten oxide counter electrodes have been found to perform better, under some conditions, in comparison to their crystalline counterparts. The amorphous state of the nickel-tungsten oxide may be obtained though the use of certain processing conditions, described below. While not wishing to be bound to any theory or mechanism, it is believed that amorphous nickel-tungsten oxide is produced by relatively higher energy atoms in the sputtering process. Higher energy atoms are obtained, for example, in a sputtering process with higher target powers, lower chamber pressures (that is, higher vacuum), and smaller source to substrate distances. Under the described process conditions, higher density films, with better stability under UV/heat exposure are produced.

In some embodiments, the thickness of the counter electrode is about 50 nm about 650 nm. In some embodiments, the thickness of the counter electrode is about 100 nm to about 400 nm, preferably in the range of about 200 nm to 300 nm. The thickness of the counter electrode layer 510 is also substantially uniform. In one embodiment, a substantially uniform counter electrode layer varies only about ±10% in each of the aforementioned thickness ranges. In another embodiment, a substantially uniform counter electrode layer varies only about ±5% in each of the aforementioned thickness ranges. In another embodiment, a substantially uniform counter electrode layer varies only about ±3% in each of the aforementioned thickness ranges.

The amount of ions held in the counter electrode layer during the bleached state (and correspondingly in the electrochromic layer during the colored state) and available to drive the electrochromic transition depends on the composition of the layers as well as the thickness of the layers and the fabrication method. Both the electrochromic layer and the counter electrode layer are capable of supporting available charge (in the form of lithium ions and electrons) in the neighborhood of several tens of millicoulombs per square centimeter of layer surface area. The charge capacity of an electrochromic film is the amount of charge that can be loaded and unloaded reversibly per unit area and unit thickness of the film by applying an external voltage or potential. In one embodiment, the $WO_3$ layer has a charge capacity of between about 30 and about 150 $mC/cm^2/$micron. In another embodiment, the $WO_3$ layer has a charge capacity of between about 50 and about 100 $mC/cm^2/$micron. In one embodiment, the NiWO layer has a charge capacity of between about 75 and about 200 $mC/cm^2/$micron. In another embodiment, the NiWO layer has a charge capacity of between about 100 and about 150 $mC/cm^2/$micron.

In electrochromic devices with distinct layers, between electrochromic layer 506 and counter electrode layer 510, there is an ion conducting layer 508. Ion conducting layer 508 serves as a medium through which ions are transported (in the manner of an electrolyte) when the electrochromic device transforms between the bleached state and the colored state. Preferably, ion conducting layer 508 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 508 is inorganic and/or solid. When fabricated from a material and in a manner that produces relatively few defects, the ion conductor layer can be made very thin to produce a high performance device. In various implementations, the ion conductor material has an ionic conductivity of between about $10^8$ Siemens/cm or $ohm^{-1}\ cm^{-1}$ and about $10^9$ Siemens/cm or $ohm^{-1}\ cm^{-1}$ and an electronic resistance of about $10^{11}$ ohms-cm.

Examples of suitable ion conducting layers (for electrochromic devices having a distinct IC layer) include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conducting layer comprises a silicate-based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide. Any material, however, may be used for the ion conducting layer 508 provided it can be fabricated with low defectivity and it allows for the passage of ions between the counter electrode layer 510 to the electrochromic layer 506 while substantially preventing the passage of electrons.

In certain embodiments, the ion conducting layer is crystalline, nanocrystalline, or amorphous. Typically, the ion conducting layer is amorphous. In another embodiment, the ion conducting layer is nanocrystalline. In yet another embodiment, the ion conducting layer is crystalline.

In some embodiments, a silicon-aluminum-oxide (SiAlO) is used for the ion conducting layer 508. In a specific embodiment, a silicon/aluminum target used to fabricate the ion conductor layer via sputtering contains between about 6 and about 20 atomic percent aluminum. This defines the ratio of silicon to aluminum in the ion conducting layer. In some embodiments, the silicon-aluminum-oxide ion conducting layer 508 is amorphous.

The thickness of the ion conducting layer 508 may vary depending on the material. In some embodiments, the ion conducting layer 508 is about 5 nm to 100 nm thick, preferably about 10 nm to 60 nm thick. In some embodiments, the ion conducting layer is about 15 nm to 40 nm thick or about 25 nm to 30 nm thick. The thickness of the ion conducting layer is also substantially uniform. In one embodiment, a substantially uniform ion conducting layer varies by not more than about ±10% in each of the aforementioned thickness ranges. In another embodiment, a substantially uniform ion conducting layer varies by not more than about ±5% in each of the aforementioned thickness ranges. In another embodiment, a substantially uniform ion conducting layer varies by not more than about ±3% in each of the aforementioned thickness ranges.

Ions transported across the ion conducting layer between the electrochromic layer and the counter electrode layer serve to effect a color change in the electrochromic layer (that is, change the electrochromic device from the bleached state to the colored state). Depending on the choice of materials for the electrochromic device stack, such ions include lithium ions ($Li^+$) and hydrogen ions ($H^+$) (that is, protons). As mentioned above, other ions may be employed in certain embodiments. These include deuterium ions ($D^+$), sodium ions ($Na^+$), potassium ions ($K^+$), calcium ions ($Ca^{++}$), barium ions ($Ba^{++}$), strontium ions ($Sr^{++}$), and magnesium ions ($Mg^{++}$).

As noted, the ion conducting layer 508 should have very few defects. Among other problems, defects in the ion conducting layer may result in short circuits between the electrochromic layer and the counter electrode layer (described in more detail below in relation to FIG. 5). A short circuit occurs when electrical communication is established between oppositely charged conductive layers, for example a conductive particle makes contact with each of two conductive and electrically charged layers (as opposed to a "pin hole" which is a defect which does not create a short circuit between oppositely charged conductive layers). When a short circuit occurs, electrons rather than ions migrate between the electrochromic layer and the counter electrode, typically resulting in bright spots (that is, spots where the window does not switch but instead, maintains the open circuit coloration which is often much lighter than the colored state) at the location of the short when the electrochromic device is otherwise in the colored state. The ion conducting layer is preferably as thin as possible, without any shorts between the electrochromic layer and the counter electrode layer. As indicated, low defectivity in the ion conducting layer 508 (or elsewhere in the electrochromic device) allows for a thinner ion conducting layer 508. Ion transport between the electrochromic layer and the counter electrode layer with electrochemical cycling is faster when using a thin ion conducting layer. To generalize, the defectivity criteria specified herein may apply to any specific layer (ion conducting layer or otherwise) in the stack or to the stack as a whole or to any portion thereof. Defectivity criteria will be further discussed below.

The electrochromic device 500 may include one or more additional layers (not shown) such as one or more passive layers. Passive layers used to improve certain optical properties may be included in electrochromic device 500. Passive layers for providing moisture or scratch resistance may also be included in the electrochromic device 500. For example, the conductive layers may be treated with anti-reflective or protective oxide or nitride layers. Other passive layers may serve to hermetically seal the electrochromic device 500.

FIG. 6A is a schematic cross-section of an electrochromic device in a bleached state (or transitioning to a bleached state). In accordance with specific embodiments, the electrochromic device 600 includes a tungsten oxide electrochromic layer (EC) 606 and a nickel-tungsten oxide counter electrode layer (CE) 610. In some cases, the tungsten oxide electrochromic layer 606 has a nanocrystalline, or substantially nanocrystalline, morphology. In some embodiments, the nickel-tungsten oxide counter electrode layer 610 has an amorphous, or substantially amorphous, morphology. In some embodiments, the weight percent ratio of tungsten to nickel in the nickel-tungsten oxide is about 0.40-0.60

The electrochromic device 600 also includes substrate 602, conductive layer (CL) 604, ion conducting layer (IC) 608, and conductive layer (CL) 614. In some embodiments, the substrate 602 and conductive layer 604 together comprise a TEC-Glass™. As indicated, the electrochromic devices described herein, such as those of FIG. 6A, often find beneficial application in architectural glass. Thus, in some embodiments, the substrate 602 is of the dimensions such that it may be classified as architectural glass. In some embodiments, the conductive layer 614 is indium tin oxide (ITO). In some embodiments, the ion conducting layer 608 is a silicon-aluminum-oxide.

The voltage source 616 is configured to apply a potential to electrochromic stack 620 through suitable connections (for example, bus bars) to conductive layers 604 and 614. In some embodiments, the voltage source is configured to apply a potential of about 2 volts in order to drive a transition of the device from one optical state to another. The polarity of the potential as shown in FIG. 6A is such that the ions (lithium ions in this example) primarily reside (as indicated by the dashed arrow) in nickel-tungsten oxide counter electrode layer 610.

In embodiments employing tungsten oxide as the electrochromic layer and nickel-tungsten oxide as the counter electrode layer, the ratio of the electrochromic layer thickness to the counter electrode layer thickness may be about 1.7:1 to 2.3:1 (for example, about 2:1). In some embodiments, the electrochromic tungsten oxide layer is about 200 nm to 700 nm thick. In further embodiments, the electrochromic tungsten oxide layer is about 400 nm to 500 nm thick. In some embodiments, the nickel-tungsten oxide counter electrode layer is about 100 nm to 350 nm thick. In further embodiments, and the nickel-tungsten oxide counter electrode layer is about 200 nm to 250 nm thick. In yet further embodiments, the nickel-tungsten oxide counter electrode layer is about 240 nm thick. Also, in some embodiments, the silicon-aluminum-oxide ion conducting layer 608 is about 10 nm to 100 nm thick. In further embodiments, the silicon-aluminum-oxide ion conducting layer is about 20 nm to 50 nm thick.

As indicated above, electrochromic materials may contain blind charge. The blind charge in an electrochromic material is the charge (for example, negative charge in the cases of tungsten oxide electrochromic material) that exists in the material as fabricated, absent compensation by oppositely charged ions or other charge carriers. With tungsten oxide, for example, the magnitude of the blind charge depends upon the excess oxygen concentration during sputtering of the tungsten oxide. Functionally, blind charge must be compensated before the ions employed to transform the electrochromic material can effectively change an optical property of the electrochromic material. Without prior compensation of the blind charge, ions supplied to an electrochromic material will irreversibly incorporate in the material and have no effect on the optical state of the material. Thus, an electrochromic device is typically provided with ions, such as lithium ions or protons, in an amount sufficient both to compensate the blind charge and to provide a supply of ions for reversibly switching the electrochromic material between two optical states. In many known electrochromic devices, charge is lost during the first electrochemical cycle in compensating blind charge.

In some embodiments, lithium is present in the electrochromic stack 620 in an amount sufficient to compensate the blind charge in the electrochromic layer 606 and then an additional amount of about 1.5 to 2.5 times the amount used to compensate the blind charge (by mass) in the stack (initially in the counter electrode layer 610 for example). That is, there is about 1.5 to 2.5 times the amount of lithium needed to compensate the blind charge that is provided for reversible cycling between the electrochromic layer 606 and the counter electrode layer 610 in the electrochromic stack 620. In some embodiments, there are enough lithium in the electrochromic stack 620 to compensate the blind charge in the electrochromic layer 606 and then about two times this amount (by mass) in the counter electrode layer 610 or elsewhere in the stack.

FIG. 6B is a schematic cross-section of electrochromic device 600 shown in FIG. 6A but in a colored state (or transitioning to a colored state). In FIG. 6B, the polarity of voltage source 616 is reversed, so that the electrochromic layer is made more negative to accept additional lithium ions, and thereby transition to the colored state. As indicated by the dashed arrow, lithium ions are transported across the ion conducting layer 608 to the tungsten oxide electrochromic layer 606. The tungsten oxide electrochromic layer 606 is shown in the colored state. The nickel-tungsten oxide counter electrode 610 is also shown in the colored state. As explained, nickel-tungsten oxide becomes progressively more opaque as it gives up (deintercalates) lithium ions. In this example, there is a synergistic effect where the transition to colored states for both layers 606 and 610 are additive toward reducing the amount of light transmitted through the stack and substrate.

The all solid state and inorganic electrochromic devices described above have low defectivity and high reliability, and thus are particularly well suited for embodiments described herein. Other low defectivity all solid state and inorganic electrochromic devices are described below.

Low-Defectivity Solid State and Inorganic Electrochromic Devices without a Distinct IC Layer As described above, an electrochromic device typically includes an electrochromic ("EC") electrode layer and a counter electrode ("CE") layer, separated by an ionically conductive ("IC") layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

Quite surprisingly, it has been discovered that high quality electrochromic devices can be fabricated without depositing an ionically conducting electrically insulating layer. In accordance with certain embodiments, the counter electrode and electrochromic electrodes are formed immediately adjacent one another, often in direct contact, without separately depositing an ionically conducting layer. It is believed that various fabrication processes and/or physical or chemical mechanisms produce an interfacial region between contacting electrochromic and counter electrode layers, and that this interfacial region serves at least some functions of an ionically conductive electronically insulating layer in devices having such a distinct layer.

In some embodiments, such electrochromic devices having an ion conducting electronically insulating interfacial region rather than a distinct IC layer are employed in one or more panes of multi-pane window units described herein. Such devices, and methods of fabricating them, are described in U.S. patent application Ser. Nos. 12/772,055 and 12/772,075, each filed on Apr. 30, 2010, and in U.S. patent application Ser. Nos. 12/814,277 and 12/814,279, each filed on Jun. 11, 2010—each of the four applications is entitled "Electrochromic Devices," each names Zhongchun Wang et al. as inventors, and each is incorporated by reference herein for all purposes. These electrochromic devices can also be made with low defectivity and thus are particularly well suited for multi-pane window units described herein. A brief description of these devices follows.

Figure 7:
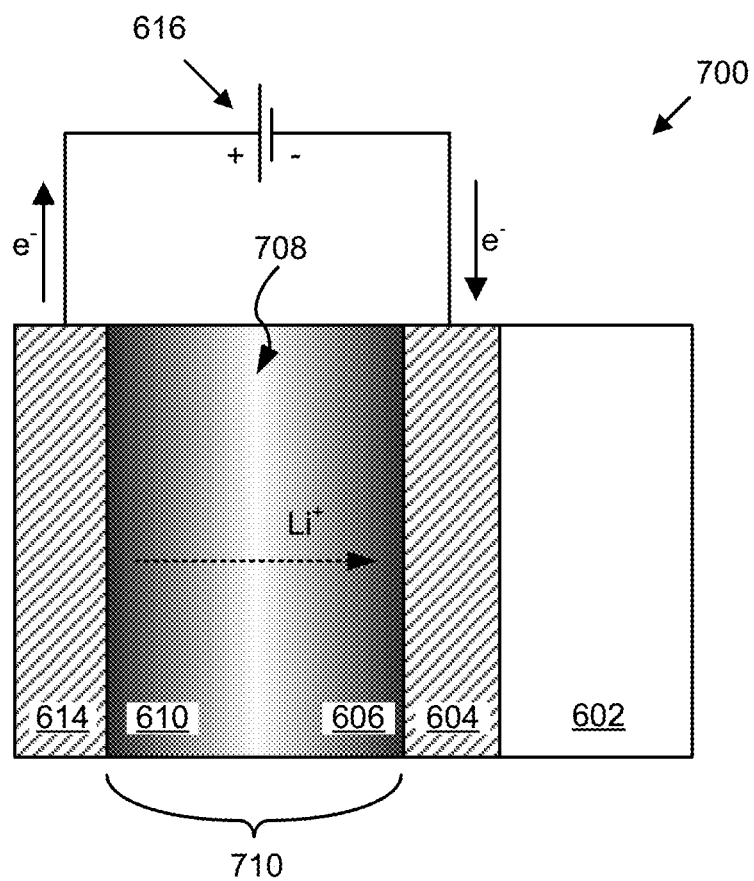
FIG. 7 is a schematic cross-section of an electrochromic device having an ion conducting electronically insulating interfacial region rather than a distinct IC layer.

FIG. 7 is a schematic cross-section of an electrochromic device, 500, in a colored state, where the device has an ion conducting electronically insulating interfacial region, 708, serving the function of a distinct IC layer. Voltage source 616, conductive layers 614 and 604, and substrate 602 are essentially the same as described in relation to FIGS. 6A and 6B. Between conductive layers 614 and 604 is a region 710, which includes counter electrode layer 610, electrochromic layer 606 and an ion conducting electronically insulating interfacial region, 708, between them, rather than a distinct IC layer. In this example, there is no distinct boundary between counter electrode layer 610 and interfacial region 708, nor is there a distinct boundary between electrochromic layer 606 and interfacial region 708. Rather, there is a diffuse transition between CE layer 610 and interfacial region 708, and between interfacial region 708 and EC layer 606. Conventional wisdom was that each of the three layers should be laid down as distinct, uniformly deposited and smooth layers to form a stack. The interface between each layer should be "clean" where there is little intermixing of materials from each layer at the interface. One of ordinary skill in the art would recognize that in a practical sense there is inevitably some degree of material mixing at layer interfaces, but the point is, in conventional fabrication methods any such mixing is unintentional and minimal. The inventors have found that interfacial regions serving as IC layers can be formed where the interfacial region includes significant quantities of one or more electrochromic and/or counter electrode materials by design. This is a radical departure from conventional fabrication methods. These all solid state and inorganic electrochromic devices also have low defectivity and reliability, and thus are particularly well suited for embodiments described herein.

Visual Defects in Electrochromic Devices

As indicated above, virtually any electrochromic device will work with the multi-pane window units described herein, by virtue of the fact that visual defects in overlapping devices, for example one each on two panes of a dual-pane window unit, are negated by the low probability that the defects will align sufficiently for the user to actually see them when both panes of the window are darkened. The electrochromic devices as described above have a reduced number of defects; that is, considerably fewer than are present in comparable prior devices, therefore they are particularly well suited for the embodiments described.

As used herein, the term "defect" refers to a defective point or region of an electrochromic device. Defects may be caused by electrical shorts or by pinholes. Further, defects may be characterized as visible or non-visible. Often a defect will be manifest as visually discernable anomalies in the electrochromic window or other device. Such defects are referred to herein as "visible" defects. Other defects are so small that they are not visually noticeable to the observer in normal use (for example, such defects do not produce a noticeable light point when the device is in the colored state during daytime). A "short" is a localized electronically conductive pathway spanning the ion conducting layer (for example, an electronically conductive pathway between the two TCO layers). A "pinhole" is a region where one or more layers of the electrochromic device are missing or damaged so that electrochromism is not exhibited. Pinholes are not electrical shorts. Three types of defects are of primary concern: (1) visible pinholes, (2) visible shorts, and (3) non-visible shorts. Typically, though not necessarily, a visible short will have a defect dimension of at least about 3 micrometers resulting in a region, for example of about 1 cm in diameter, where the electrochromic effect is perceptibly diminished—these regions can be reduced significantly by isolating the defect, for example circumscribing the defect via laser scribe, causing the visible short so that to the naked eye the visible short will resemble only a visible pinhole. A visible pinhole will have a defect dimension of at least about 100 micrometers, thus is much harder to discern visually than a visible short. One aspect of the invention is to reduce, if not eliminate, the number of visual defects the end user actually observes.

In some cases, an electrical short is created by a conductive particle lodging in the ion conducting layer, thereby causing an electronic path between the counter electrode layer and the electrochromic layer or the TCO associated with either one of them. In some other cases, a defect is caused by a particle on the substrate (on which the electrochromic stack is fabricated) and such particle causes layer delamination (sometimes called "pop-off") or the layers not to adhere to the substrate. Both types of defects are illustrated below in FIGS. 5 and 6A-6C. A delamination or pop-off defect can lead to a short if it occurs before a TCO or associated EC or CE is deposited. In such cases, the subsequently deposited TCO or EC/CE layer will directly contact an underlying TCO or CE/EC layer providing direct electronic conductive pathway. A few examples of defect sources are presented in Table 2 below. Table 2 is intended to provide examples of mechanisms that lead to the different types of visible and non-visible defects. Additional factors exist which may influence how the EC window responds to a defect within the stack.

An electrical short, even a non-visible one, can cause leakage current across the ion conducting layer and result in a potential drop in the vicinity of the short. If the potential drop is of sufficient magnitude it will prevent the electrochromic device from undergoing an electrochromic transition in the vicinity of the short. In the case of a visible short the defect will appear as a light central region (when the device is in the colored state) with a diffuse boundary such that the device gradually darkens with distance from the center of the short. If there are a significant number of electrical shorts (visible or non-visible) concentrated in an area of an electrochromic device, they may collectively impact a broad region of the device whereby the device cannot switch in such region. This is because the potential difference between the EC and CE layers in such regions cannot attain a threshold level required to drive ions across the ion conductive layer.

TABLE 2

| Particle Location | Worst Case Failure | Effect |
|---|---|---|
| float | pops off leaving pinhole | pinhole |
| TEC | pops off-ITO-TEC short | visible short voltage drop |
| EC | leakage across IC | visible short voltage drop |
| IC | pops off leaving pinhole | pinhole |
| CE | pops off leaving pinhole | pinhole |

In certain implementations described herein, the shorts (both visible and non-visible) are sufficiently well controlled that the leakage current does not have this effect anywhere on the device. It should be understood that leakage current may result from sources other than short-type defects. Such other sources include broad-based leakage across the ion conducting layer and edge defects such as roll off defects as described elsewhere herein and scribe line defects. The emphasis here is on leakage caused only by points of electrical shorting across the ion conducting layer (or interfacial region) in the interior regions of the electrochromic device. It should be noted, however, that electrochromic devices employing interfacial regions serving as IC layers, as described above, can have higher than conventionally accepted leakage currents but the devices show good performance nonetheless. However, visual defects do still occur in these electrochromic devices.

Figure 8:
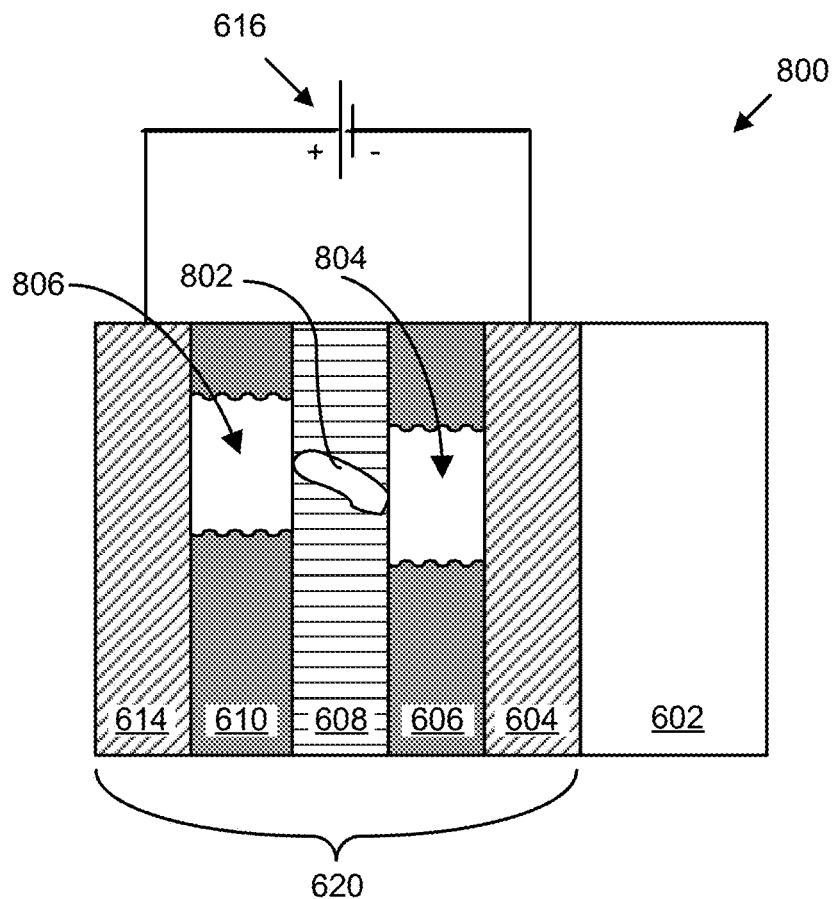
FIG. 8 is a schematic cross-section of an electrochromic device with a particle in the ion conducting layer causing a localized defect in the device.

FIG. 8 is a schematic cross-section of an electrochromic device 800 with a particle in the ion conducting layer causing a localized defect in the device. Device 800 is depicted with typical distinct layers, although particles in this size regime would cause visual defects in electrochromic devices employing ion conducting electronically insulating interfacial regions as well. Electrochromic device 800 includes the same components as depicted in FIG. 6A for electrochromic device 600. In the ion conducting layer 608 of electrochromic device 800, however, there is a conductive particle 802 or other artifact causing a defect. Conductive particle 802 results in a short between electrochromic layer 606 and counter electrode layer 610. This short does not allow the flow of ions between electrochromic layer 606 and counter electrode layer 610, instead allowing electrons to pass locally between the layers, resulting in a transparent region 804 in the electrochromic layer 606 and a transparent region 806 in the counter electrode layer 610 when the remainder of layers 610 and 606 are in the colored state. That is, if electrochromic device 800 is in the colored state, conductive particle 802 renders regions 804 and 806 of the electrochromic device unable to enter into the colored state. These defect regions are sometimes referred to as "constellations" because they appear as a series of bright spots (or stars) against a dark background (the remainder of the device being in the colored state). Humans will naturally direct their attention to the constellations and often find them distracting or unattractive.

Figure 9A:
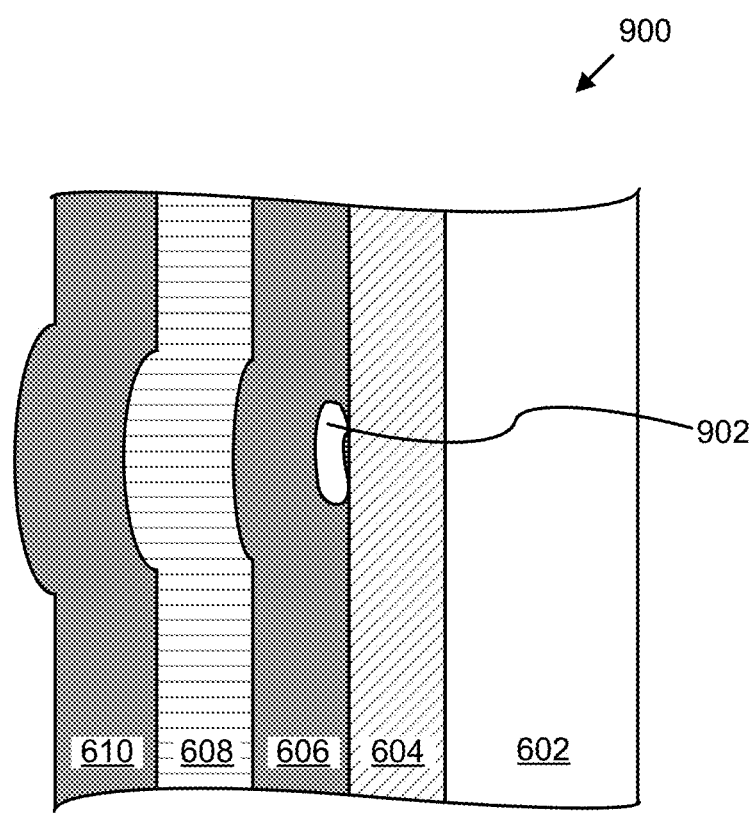
FIG. 9A is a schematic cross-section of an electrochromic device with a particle on the conductive layer prior to depositing the remainder of the electrochromic stack.

FIG. 9A is a schematic cross-section of an electrochromic device 900 with a particle 902 or other debris on conductive layer 604 prior to depositing the remainder of the electrochromic stack. Electrochromic device 900 includes the same components as electrochromic device 600. Particle 902 causes the layers in the electrochromic stack 620 to bulge in the region of particle 902, due to conformal layers 606-610 being deposited sequentially over particle 902 as depicted (in this example, layer 614 has not yet been deposited). While not wishing to be bound by a particular theory, it is believed that layering over such particles, given the relatively thin nature of the layers, can cause stress in the area where the bulges are formed. More particularly, in each layer, around the perimeter of the bulged region, there can be defects in the layer, for example in the lattice arrangement or on a more macroscopic level, cracks or voids. One consequence of these defects would be, for example, an electrical short between electrochromic layer 606 and counter electrode layer 610 or loss of ion conductivity in layer 608. These defects are not depicted in FIG. 9A, however.

Figure 9B:
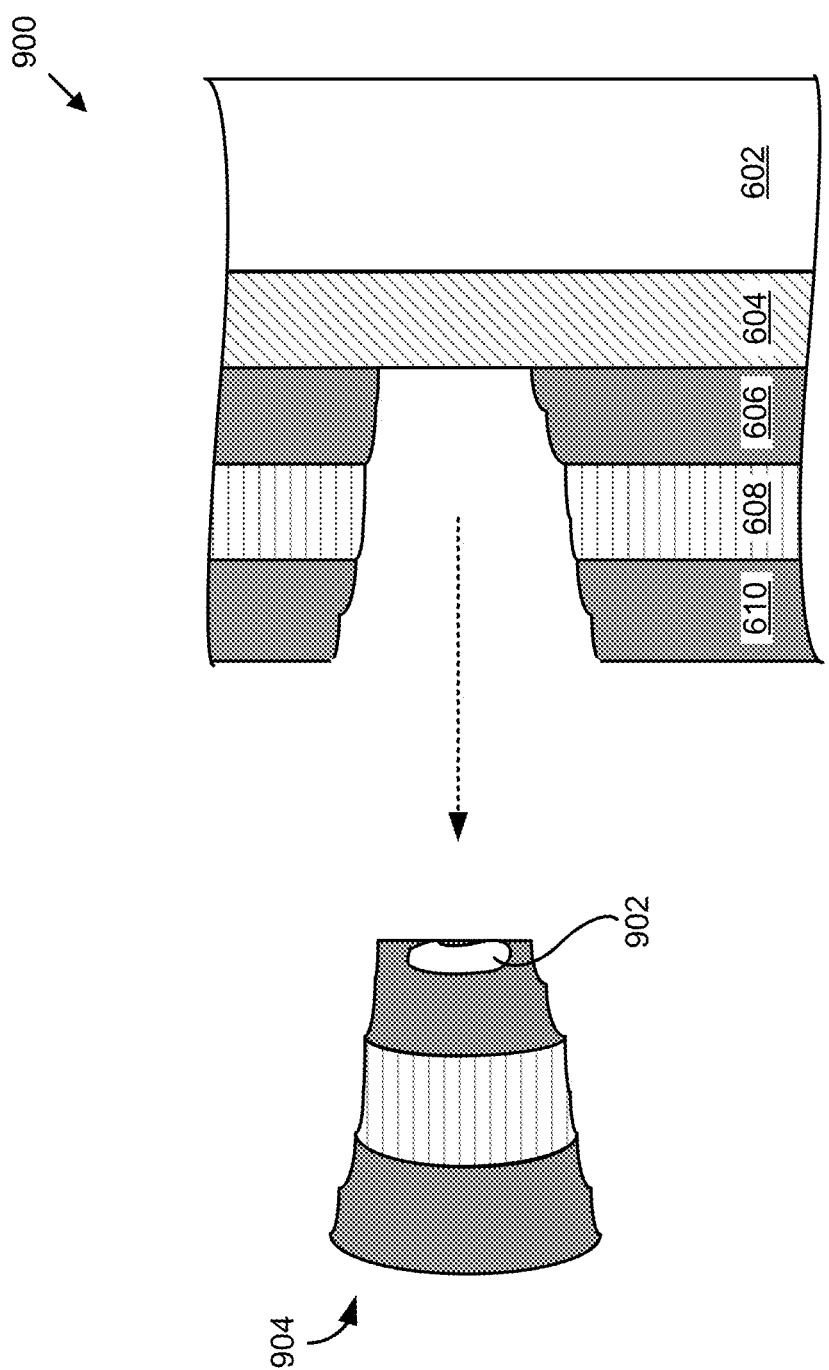
FIG. 9B is a schematic cross-section of the electrochromic device of FIG. 6A, where a "pop off" defect is formed during electrochromic stack formation.
Figure 9C:
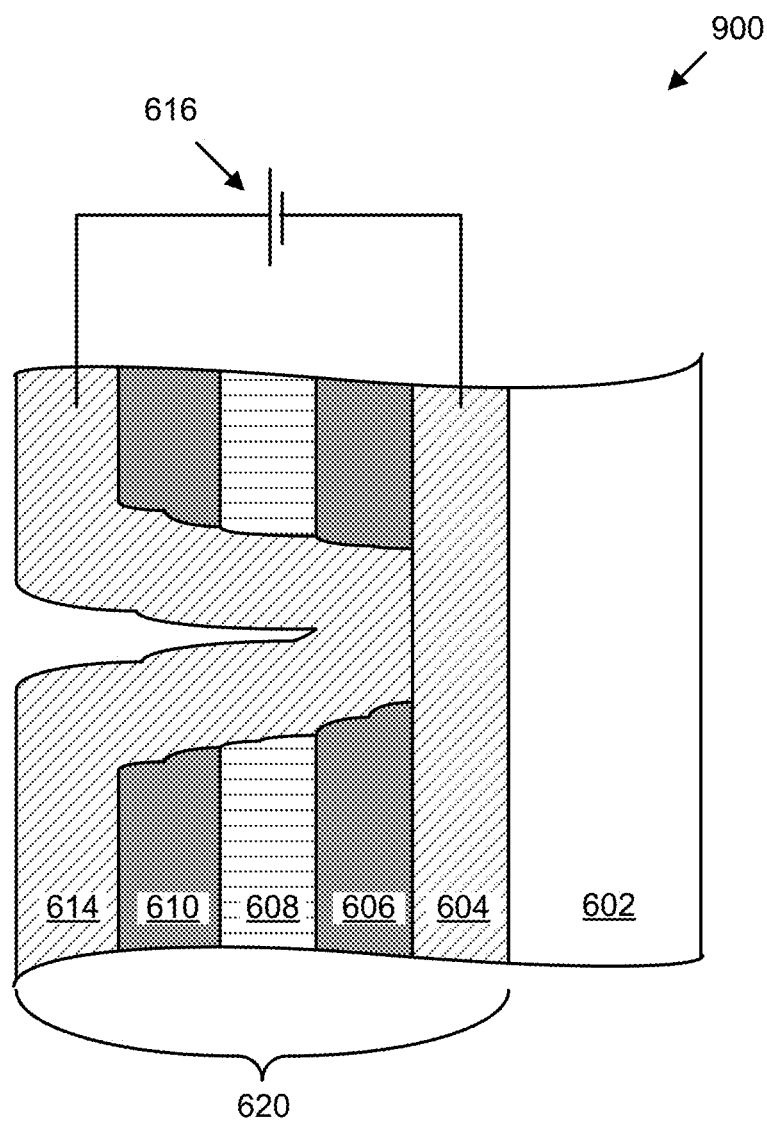
FIG. 9C is a schematic cross-section of the electrochromic device of FIG. 6B, showing an electrical short that is formed from the pop off defect once the second conductive is deposited.

Referring to FIG. 9B, another consequence of defects caused by particle 902 is called a "pop-off." In this example, prior to deposition of conductive layer 614, a portion above the conductive layer 604 in the region of particle 902 breaks loose, carrying with it portions of electrochromic layer 606, ion conducting layer 608, and counter electrode layer 610. The "pop-off" is piece 904, which includes particle 902, a portion of electrochromic layer 606, as well as ion conducting layer 608 and counter electrode layer 610. The result is an exposed area of conductive layer 604. Referring to FIG. 9C, after pop-off and once conductive layer 614 is deposited, an electrical short is formed where conductive layer 614 comes in contact with conductive layer 604. This electrical short would leave a transparent region in electrochromic device 900 when it is in the colored state, similar in appearance to the defect created by the short described above in relation to FIG. 8.

Pop-off defects due to particles or debris on substrate 602 or 604 (as described above), on ion conducting layer 608, and on counter electrode layer 610 may also occur, causing pinhole defects when the electrochromic device is in the colored state.

The net result of the aforementioned defects are that constellations, electrical shorts and other defects result in pinholes, even after, for example, laser scribing used to isolate and minimize such defects. So, it is desirable to use low-defectivity electrochromic devices in order to reduce the overall number of pinholes that do exist after mitigation efforts. Below is a brief description of integrated systems for manufacturing such low-defectivity all solid state and inorganic electrochromic devices on architectural-scale substrates.

Low-Defectivity Electrochromic Devices

The electrochromic devices described above can be manufactured in an integrated deposition system, for example, on architectural glass. The electrochromic devices are used to make window units, for example IGU's, which in turn are used to make electrochromic windows. The term "integrated deposition system" means an apparatus for fabricating electrochromic devices on optically transparent and translucent substrates. The apparatus has multiple stations, each devoted to a particular unit operation such as depositing a particular component (or portion of a component) of an electrochromic device, as well as cleaning, etching, and temperature control of such device or portion thereof. The multiple stations are fully integrated such that a substrate on which an electrochromic device is being fabricated can pass from one station to the next without being exposed to an external environment. Integrated deposition systems operate with a controlled ambient environment inside the system where the process stations are located. An exemplary integrated deposition system is described in relation to FIG. 9.

Figure 10:
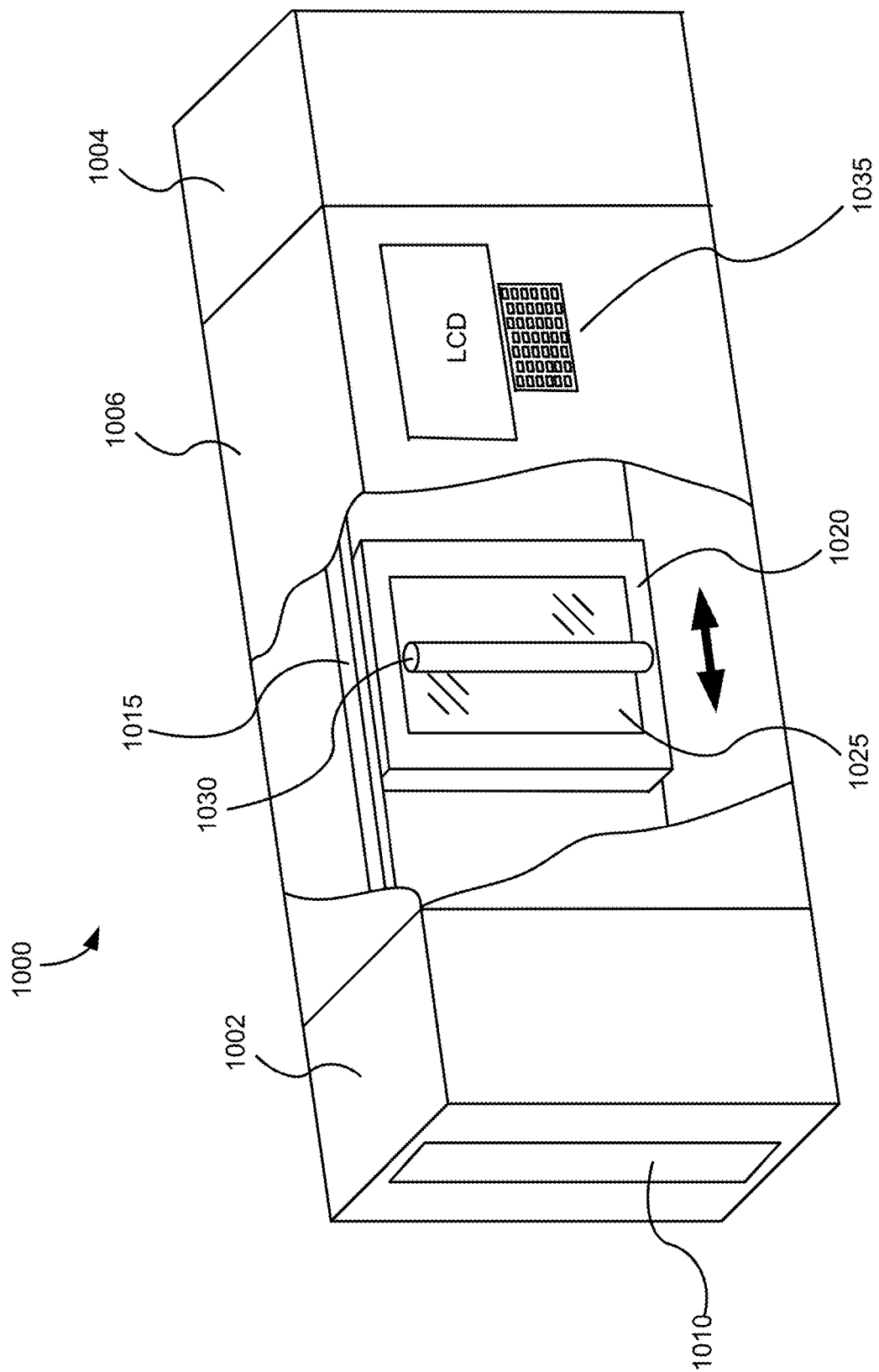
FIG. 10 depicts an integrated deposition system for making all-solid-state electrochromic devices on architectural glass scale substrates.

FIG. 10, depicts in perspective schematic fashion an integrated deposition system 1000 in accordance with certain embodiments. In this example, system 1000 includes an entry load lock, 1002, for introducing the substrate to the system, and an exit load lock, 1004, for removal of the substrate from the system. The load locks allow substrates to be introduced and removed from the system without disturbing the controlled ambient environment of the system. Integrated deposition system 1000 has a module, 1006, with a plurality of deposition stations to deposit the various layers of the electrochromic stack, for example those described above. Individual stations within an integrated deposition systems can contain heaters, coolers, various sputter targets and means to move them, RF and/or DC power sources and power delivery mechanisms, etching tools for example plasma etch, gas sources, vacuum sources, glow discharge sources, process parameter monitors and sensors, robotics, power supplies, and the like.

There is an entry port, 1010, for loading, for example, architectural glass substrate 1025 (load lock 1004 has a corresponding exit port). Substrate 1025 is supported by a pallet, 1020, which travels along a track, 1015. Pallet 1020 can translate (as indicated by the double headed arrow) forward and/or backward through system 1000 as may be desired for one or more deposition processes. In this example, pallet 1020 and substrate 1025 are in a substantially vertical orientation. A substantially vertical orientation helps to prevent defects because particulate matter that may be generated, for example, from agglomeration of atoms from sputtering, will tend to succumb to gravity and therefore not deposit on substrate 1025. Also, because architectural glass substrates tend to be large, a vertical orientation of the substrate as it traverses the stations of the integrated deposition system enables coating of thinner glass substrates since there are less concerns over sag that occurs with thicker hot glass.

Target 1030, in this case a cylindrical target, is oriented substantially parallel to and in front of the substrate surface where deposition is to take place (for convenience, other sputter means are not depicted here). Substrate 1025 can translate past target 1030 during deposition and/or target 1030 can move in front of substrate 1025.

Integrated deposition system 1000 also has various vacuum pumps, gas inlets, pressure sensors and the like that establish and maintain a controlled ambient environment within the system. These components are not shown, but rather would be appreciated by one of ordinary skill in the art. System 1000 is controlled, for example, via a computer system or other controller, represented in FIG. 10 by an LCD and keyboard, 1035. One of ordinary skill in the art would appreciate that embodiments of the present invention may employ various processes involving data stored in or transferred through one or more computer systems. The control apparatus may be specially constructed for the required purposes, or it may be a general-purpose computer selectively activated or reconfigured by a computer program and/or data structure stored in the computer.

By using such an integrated deposition system, electrochromic devices of very low defectivity can be produced. In one embodiment, the number of visible pinhole defects in a single electrochromic device is no greater than about 0.04 per square centimeter. In another embodiment, the number of visible pinhole defects in a single electrochromic device is no greater than about 0.02 per square centimeter, and in more specific embodiments, the number of such defects is no greater than about 0.01 per square centimeter.

As mentioned, typically, the visible short-type defects are individually treated after fabrication, for example laser scribed to isolate them, to leave short-related pinholes as the only visible defects. In one embodiment, the number of visible short related pinhole defects in a single electrochromic device is no greater than about 0.005 per square centimeter. In another embodiment, the number of visible short-related pinhole defects in a single electrochromic device is no greater than about 0.003 per square centimeter, and in more specific embodiments, the number of such defects is no greater than about 0.001 per square centimeter. In one embodiment, the total number of visible defects, pinholes and short-related pinholes created from isolating visible short-related defects in a single device, is less than about 0.1 defects per square centimeter, in another embodiment less than about 0.08 defects per square centimeter, in another embodiment less than about 0.045 defects per square centimeter (less than about 450 defects per square meter of window).

In conventional electrochromic windows, one pane of electrochromic glass is integrated into an IGU. An IGU includes multiple glass panes assembled into a unit, generally with the intention of maximizing the thermal insulating properties of a gas contained in the space formed by the unit while at the same time providing clear vision through the unit. Insulating glass units incorporating electrochromic glass would be similar to IGU's currently known in the art, except for electrical leads for connecting the electrochromic glass to voltage source. Due to the higher temperatures (due to absorption of radiant energy by an electrochromic glass) that electrochromic IGU's may experience, more robust sealants than those used in conventional IGU's may be necessary. For example, stainless steel spacer bars, high temperature polyisobutylene (PIB), new secondary sealants, foil coated PIB tape for spacer bar seams, and the like.

Although the electrochromic devices described above have very low defectivity, there are still visible defects. And since conventionally an IGU includes only one pane of glass which has an electrochromic device, even if such an IGU included the low defectivity devices, at least a small number of defects would still be apparent when the window is in the colored state.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. An electrochromic window comprising:
a first substantially transparent substrate comprising a first electrochromic device disposed thereon; and
a second substantially transparent substrate comprising a second electrochromic device disposed thereon;
wherein the first and second substantially transparent substrates are registered, one in front of the other, and the electrochromic window is configured to transition the first electrochromic device and/or the second electrochromic device to provide up to four optical states for the electrochromic window;
wherein the electrochromic window comprises an insulated glass unit having an interior space between the first substantially transparent substrate and the second substantially transparent substrate, the interior space comprising a gas or a vacuum; and
wherein the electrochromic window is configured such that transitions in the first electrochromic device and/or the second electrochromic device are configured to complement each other and to reduce curtaining effect.

2. The electrochromic window of claim 1, wherein the first electrochromic device and the second electrochromic device are entirely solid state.

3. The electrochromic window of claim 1, wherein the up to four optical states comprise three optical states configured to provide:
(i) transmittance through the electrochromic window of between about 60% and about 90%;
ii) transmittance through the electrochromic window of between about 15% and about 30%; and
iii) transmittance through the electrochromic window of between about 5% and about 10%.

4. The electrochromic window of claim 1, wherein at least one of the first and second electrochromic devices is on a surface facing an interior region of the insulated glass unit.

5. The electrochromic window of claim 1, wherein at least one of the first and second substantially transparent substrates comprises one or more of an ultraviolet absorbing and/or reflecting coating, an infrared absorbing and/or reflecting coating, and a low emissivity coating.

6. The electrochromic window of claim 1, wherein each of the first and second electrochromic devices comprises an electrochromic layer comprising tungsten oxide or doped tungsten oxide and a counter electrode layer comprising nickel tungsten oxide.

7. The electrochromic window of claim 6, wherein the counter electrode layer comprises tantalum.

8. The electrochromic window of claim 1, wherein the up to four optical states include an optical state configured to provide transmittance through the electrochromic window of between about 0.1% and about 5%.

9. The electrochromic window of claim 1, further comprising a controller in electrical communication with the first electrochromic device and the second electrochromic device.

10. The electrochromic window of claim 9, wherein the controller is configured to cause sharing of electrical charge between the first electrochromic device and the second electrochromic device.

11. The electrochromic window of claim 9, wherein the controller comprises instructions for carrying out charge sharing operations between the first electrochromic device and the second electrochromic device.

12. The electrochromic window of claim 9, wherein the up to four optical states include at least four optical states.

13. The electrochromic window of claim 1, further comprising a sealing separator disposed between the first substantially transparent substrate and the second substantially transparent substrate.

14. A method of operating an electrochromic window comprising a first substantially transparent substrate having a first electrochromic device disposed thereon and a second substantially transparent substrate having a second electrochromic device disposed thereon, wherein the electrochromic window comprises an insulated glass unit having an interior space between the first substantially transparent substrate and the second substantially transparent substrate, the interior space comprising a gas or a vacuum, the method comprising:
- sharing electrical charge between the first electrochromic device and the second electrochromic device; and
- transitioning the first electrochromic device and/or the second electrochromic device such that the electrochromic window transitions between two of up to four optical states, wherein transitions in the first electrochromic device and/or the second electrochromic device are configured to complement each other and to reduce curtaining effect.

15. The electrochromic window of claim 1, wherein the first electrochromic device comprises a first pair of separate bus bars and the second substantially transparent substrate comprises a second pair separate bus bars.

16. The electrochromic window of claim 15, wherein the first pair of separate bus bars and the second pair of separate bus bars are configured to deliver power such that transitions in the first electrochromic device and the second electrochromic device complement each other and reduce curtaining effect.

17. The electrochromic window of claim 15, wherein the first pair of separate bus bars are along opposing edges of the first electrochromic device and the second pair of separate bus bars are along opposing edges of the second electrochromic device.

* * * * *